United States Patent [19]
Muratani et al.

[11] Patent Number: 6,061,451
[45] Date of Patent: May 9, 2000

[54] APPARATUS AND METHOD FOR RECEIVING AND DECRYPTING ENCRYPTED DATA AND PROTECTING DECRYPTED DATA FROM ILLEGAL USE

[75] Inventors: Hirofumi Muratani, Kawasaki; Akihiro Muto, Kodaira, both of Japan

[73] Assignee: Digital Vision Laboratories Corporation, Tokyo, Japan

[21] Appl. No.: 08/921,783

[22] Filed: Sep. 2, 1997

[30] Foreign Application Priority Data

| Sep. 3, 1996 | [JP] | Japan | 8-233100 |
| Nov. 12, 1996 | [JP] | Japan | 8-300407 |
| Apr. 30, 1997 | [JP] | Japan | 9-112539 |
| Apr. 30, 1997 | [JP] | Japan | 9-112540 |

[51] Int. Cl.$^7$ .................................................. H04N 7/167
[52] U.S. Cl. ............................. 380/201; 380/202; 705/58
[58] Field of Search ................................. 380/10, 28, 16, 380/20, 46, 201, 202, 203; 348/473; 360/60, 69; 705/58

[56] References Cited

U.S. PATENT DOCUMENTS

| 5,029,207 | 7/1991 | Gammie | 380/10 |
| 5,434,721 | 7/1995 | Sawada et al. | 360/69 |
| 5,613,004 | 3/1997 | Cooperman et al. | 380/28 |
| 5,739,864 | 4/1998 | Copeland | 348/473 |
| 5,742,680 | 4/1998 | Wilson | 380/16 |
| 5,757,909 | 5/1998 | Park | 380/201 |
| 5,787,171 | 7/1998 | Kubota et al. | 380/20 |
| 5,787,179 | 7/1998 | Ogawa et al. | 380/46 |
| 5,923,486 | 7/1999 | Sugiyama et al. | 360/60 |

*Primary Examiner*—Gilberto Barron, Jr.
*Assistant Examiner*—Matthew Smithers
*Attorney, Agent, or Firm*—Christensen O'Connor Johnson & Kindness PLLC

[57] ABSTRACT

A data receiving apparatus is formed of a set top unit connected to a network and a security module. Digital video data which is supplied from the network and scrambled according to a first system is scrambled according to a second system in a scramble circuit in the set top unit, and is supplied to the security module. The data is descrambled according to the first system in a descramble circuit in the security module, and is transferred back to the set top unit. The data is descrambled according to the second system in a descramble circuit in the set top unit, and is outputted to an image display terminal via an MPEG decoder.

39 Claims, 26 Drawing Sheets

APPARATUS AND METHOD FOR RECEIVING AND DECRYPTING ENCRYPTED DATA AND PROTECTING DECRYPTED DATA FROM ILLEGAL USE

BACKGROUND OF THE INVENTION

The present invention relates to a data receiving apparatus which reproduces and outputs multimedia data such as images and characters transmitted from, for example, a computer network and a digital broadcasting network, or multimedia data such as images and characters outputted from drives of information media such as CD-ROM and DVD to a personal computer and a television receiver, and more specifically, relates to a data receiving apparatus which has a function to protect decrypted data transmitted or outputted with being encrypted.

This application is based on Japanese Patent Application No. 8-233100, filed Sep. 3, 1996, No. 8-300407, filed Nov. 12, 1996, No. 9-112539, filed Apr. 30, 1997, and No. 9-112540, filed Apr. 30, 1997, the content of which is incorporated herein by reference.

In recent years, there have been proposed a data receiving apparatus which receives so-called multimedia data transmitted from digital broadcasting networks such as a computer network and digital satellite broadcasting, and from data storage media such as DVD (Digital Versatile Disc), and which outputs them into a personal computer and a television receiver. When each home is equipped with such a data receiving apparatus, a service providing system of multimedia data including a video, sound and characters such as video-on-demand service can be realized.

Consequently, where the above-mentioned service providing system is constructed, it is important to protect rights such as a copyright of creators and data providers (individual and companies) of multimedia data. Since multimedia data are provided as digital data, it is easy to copy the data by using a personal computer. Moreover, where multimedia data are converted into an analog signal (video signal, etc.) so as to be supplied to a television receiver, it is easy to record the data into a video tape by a video cassette recorder. Therefore, where a system which distributes multimedia data efficiently is constructed, the problem of protecting rights of data providers is inevitable and important matter.

In general, in order to prevent a third party who is not a genuine contractor from receiving data without fee, a service provider provides encrypted data. The service provider informs only the contractors of encryption keys so that only the contractors can decrypt the encrypted data correctly. Here, data are supplied to the contractors through not only a cable network but also a wireless LAN, television broadcasting, a storage medium, etc.

As a conventional example of such a data receiving apparatus, there is an apparatus shown in FIG. 1. This apparatus comprises a set top unit 10, a security module 20 and an IC card 30, but the set top unit 10 and the security module 20 form one unit actually, and thus one product (information receiving apparatus) is realized. Therefore, only IC card 30 is separated from this product.

In the case of a network, wireless LAN or television broadcasting, encrypted data (here, encrypt means scramble, and hereinafter, encrypted data is referred to as scrambled data) supplied from an antenna or outputted from a storage medium are inputted into a receiver/demodulator 12 of the set top unit 10. In this example, original data is digital image data which have been encoded by the MPEG encoding algorithm. Output of the receiver/demodulator 12 (scrambled data) is supplied to the security module 20, and is inputted to a descramble circuit 22 and a filter 24.

The filter 24 extracts ECM data and EMM data from inputted stream data, and supplies them to an interface 26. The ECM and EMM data are data which are defined in the MPEG-2, and ECM means Entitlement Control Message, and EMM means Entitlement Management Message. Concretely, they are a stream including control data which flows in an MPEG transport stream when payload of a packet of the MPEG transport stream which transports an image and sound data is scrambled.

The ECM includes data for access control which is peculiar to the streams of image and sound data such as a key necessary for releasing the scramble, a program number (in the MPEG-2, the program means a group of image and sound stream data having a common time base), and the fee for the program.

The EMM includes data for access control relating to the whole system. For example, the EMM includes names of new users and new program numbers.

In such a manner, the filter 24 performs filtering for extracting the streams (in the case of a program stream, a program stream map, and in the case of a transport stream, a TS program map section) including ECM and EMM transmitted mixing with the streams of the image and sound data encoded by the MPEG encoding algorithm. Such filtering is performed according to PIDs (packet ID) allocated to the packets and values of stream IDs.

The interface 26 is connected to the IC card 30 owned by a contractor. The service provider who transmits digital image data previously writes a descramble key corresponding to scramble of transmission, a password of an user, etc. into the IC card 30, and hands it to the user upon the contraction.

In the system shown in FIG. 1 owning the data receiving apparatus (formed of the set top unit 10 and the security module 20) means a sort of authentication, but in order to cope with an apparatus theft, authentication such as password verification is actually performed.

For this reason, the IC card 30 is connected to the interface 26, the authentication is performed by using a user's password which has been previously written into the IC card 30. When the authentication is finished successfully, the descramble key or secret data required for decrypting encrypted descramble key is inputted from the IC card 30 into the descramble circuit 22 in the security module 20.

The descramble circuit 22 descrambles scrambled data supplied from the set top unit 10 by using the descramble key, and transmits the original digital image data coded by the MPEG method back to the set top unit 10. The original image data are outputted through a demultiplexer 14 and an MPEG decoder 16 in the set top unit 10 into a user terminal (image display unit, etc.), not shown. The MPEG decoder 16 includes an analog/digital converter, and outputs an analog video signal corresponding to the original image data.

In such a manner, the scrambled data are descrambled according to the security module 20, and the original digital image data coded by the MPEG method are supplied to the set top unit 10. Therefore, only a genuine user having the descramble key in the IC card 30 can descramble the scrambled data.

However, in the data receiving apparatus, the user's secret information such as the descramble key and the password appears in the interface 26. Therefore, the user's secret information can be stolen by a third party through the interface 26, and thus there arises problems of the user protection and security.

In order to avoid such a problem, there is proposed that the IC card 30 and the security module 20 form one unit (the set top unit 10 is separated from the security module 20). In this case, user's secret information is not stolen by a third party, but since original digital image data, which have been descrambled, appears at the interface between the security module 20 and the set top unit 10, the digital data can be utilized (copied, etc.) illegally, and this threatens the service provider.

The above-mentioned problems are not limited to the case of receiving and decrypting data supplied through a network, so the problems arise similarly in the case of distribution of packaged software etc.

As described above, the conventional data receiving apparatus was insufficient to protect encrypted data.

BRIEF SUMMARY OF THE INVENTION

Accordingly, it is an object of the present invention to provide a data receiving apparatus which can prevent illegal use of encrypted data.

According to the present invention, the data receiving apparatus comprising first and second units. The first unit encrypts data, which have been encrypted according to a first encrypt system and supplied, according to a second encrypt system, and transmits the encrypted data to the second unit. The second unit decrypts the encrypted data according to a first decrypt system, and transfers the data back to the first unit.

Therefore, since only the data which have been encrypted according to the second encrypt system appears in an interface between the first and second units, illegal use of the decrypted data is prevented. Moreover, since user's secrete data are not outputted from the second unit to outside, the user's secret data can be protected securely.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a data receiving apparatus according to the present invention will now be described with reference to the accompanying drawings.

First Embodiment

Figure 1:
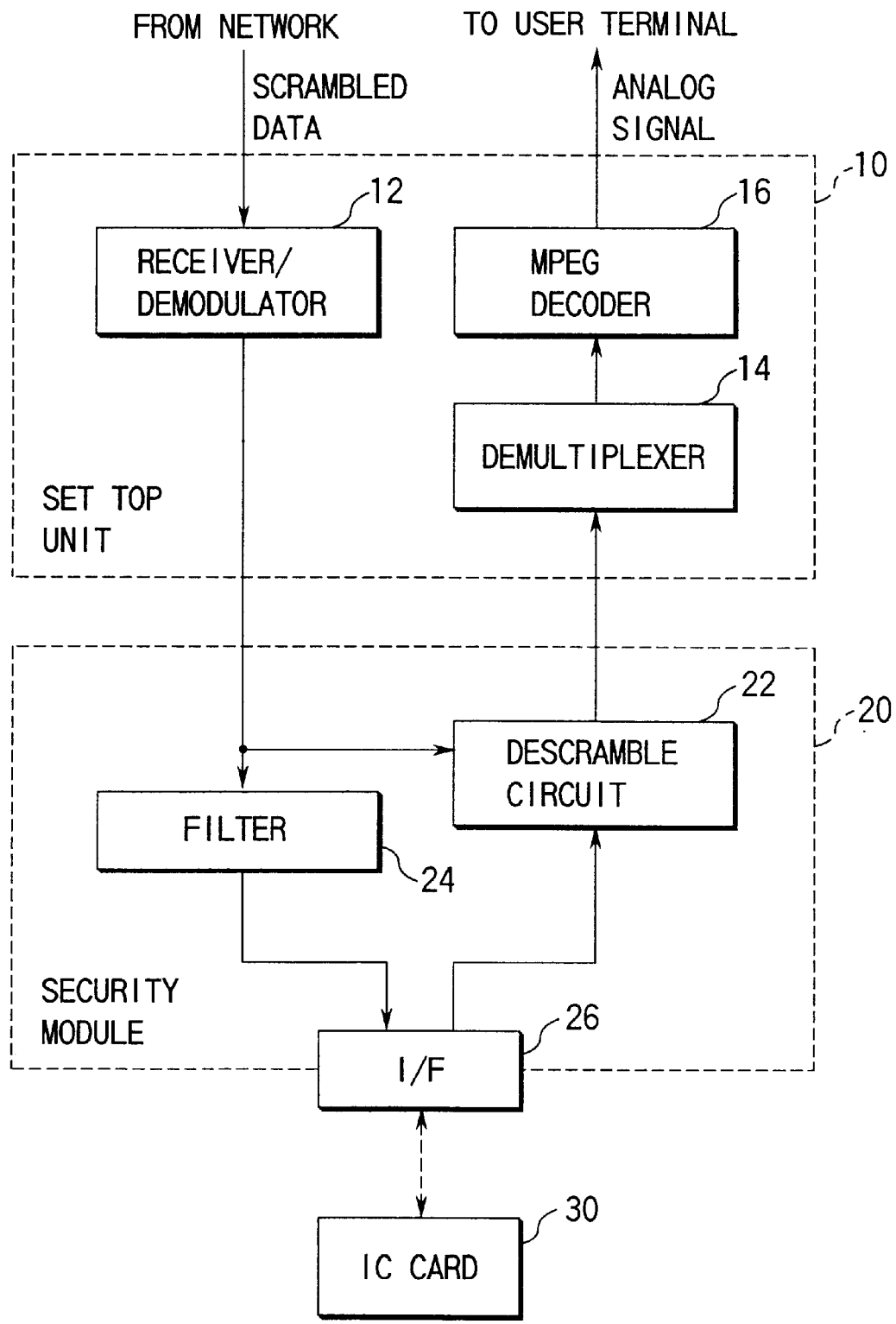
FIG. 1 is a block diagram showing a data receiving apparatus according to a conventional example.
Figure 2:
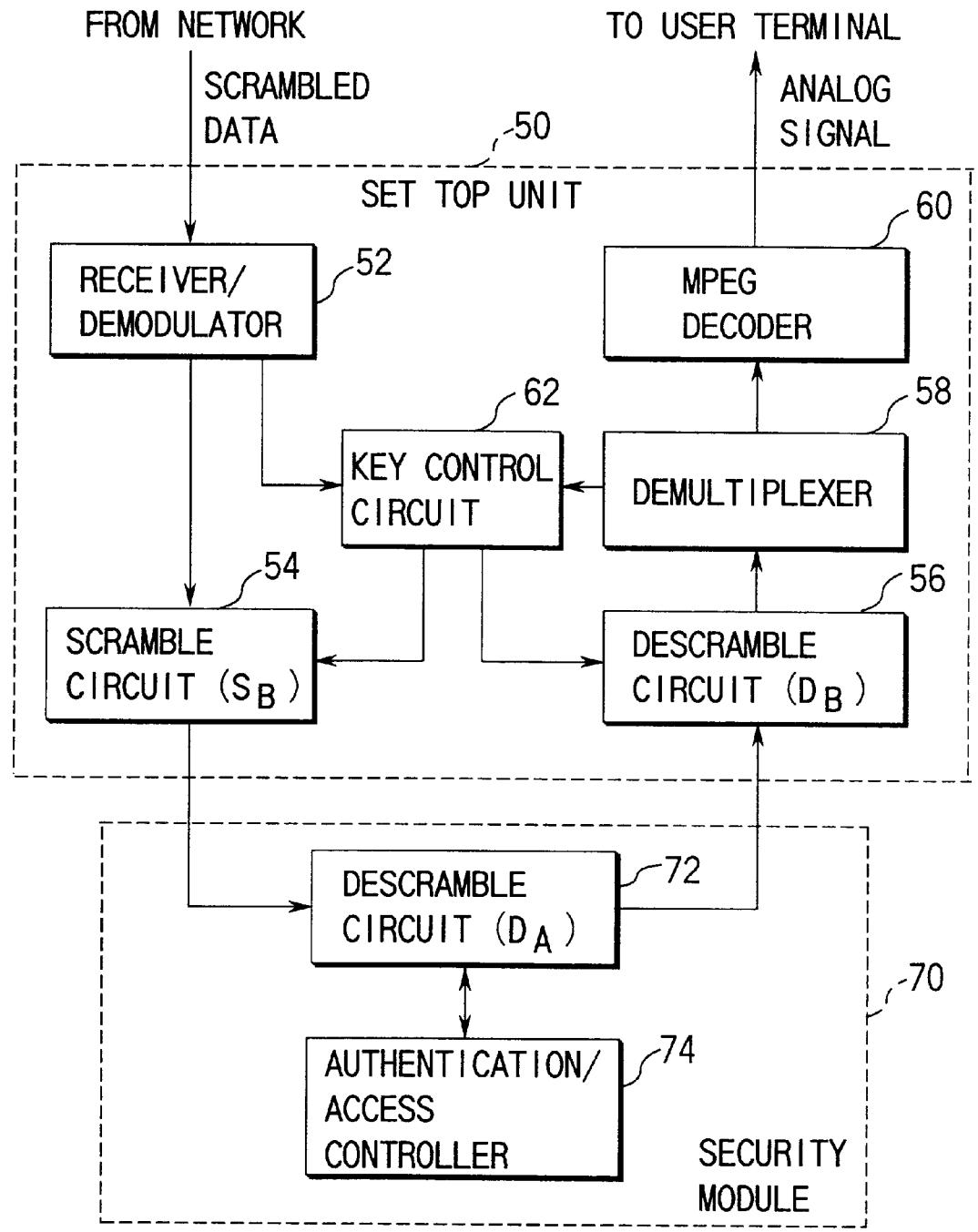
FIG. 2 is a block diagram showing a data receiving apparatus according to a first embodiment of the present invention.

FIG. 2 is a block diagram of the first embodiment. The present embodiment comprises a set top unit 50 and a security module 70. They are different from the conventional example shown in FIG. 1, and are separated from each other. They are detachable and an interface exists therebetween.

The set top unit 50 comprises a receiver/demodulator 52, a scramble circuit 54, a descramble circuit 56, a demultiplexer 58, an MPEG decoder 60 and a key control circuit 62. The security module 70 comprises a descramble circuit 72 and an authentication/access controller 74. Here, the security module 70 may be realized not as a unit but an IC card.

Similarly to the conventional example, encrypted data (scrambled MPEG digital image data) supplied from a network or an antenna are inputted into the receiver/demodulator 52 of the set top unit 10. The data is scrambled according to a server of data (not shown). This scramble process is referred to as the first scramble process $S_A$. An output of the receiver/demodulator 52 is supplied to the scramble circuit 54 which performs the second scramble process $S_B$ different from the first scramble process $S_A$ and to the key control circuit 62 which controls a key of the second scramble process.

When data is supplied from the receiver/demodulator 52 to the key control circuit 62, the key control circuit 62 generates the scramble key for the second scramble process $S_A$ and corresponding descramble key, and supplies the scramble key and descramble key respectively to the scramble circuit 54 and the descramble circuit 56. Here, unlike the conventional example shown in FIG. 1, since those keys are not outputted outside the set top unit 50, user's secret data are protected securely. When the first and second descramble processes are respectively $D_A$ and $D_B$, the key control circuit 62 generates a scramble key for the second scramble process $S_A$ and a descramble key so that $D_B \cdot D_A \cdot S_B \cdot S_A = I$ (I: identity transformation) is satisfied.

The scramble circuit 54 performs the second scramble process $S_B$ by using the scramble key supplied from the key control circuit 62. The output of the scramble circuit 54 is supplied to the security module 70, and is inputted into the descramble circuit 72 for performing the first descramble process $D_A$.

The descramble circuit 72 performs the first descramble process $D_A$ on the data supplied from the set top unit 50 using a descramble key supplied from the authentication/access controller 74, and transmits the descrambled data back to the set top unit 50. The service provider who transmits the digital image data previously writes a descramble key corresponding to the first scramble process $S_A$ upon transmission into the authentication/access controller 74, and hands it to a user upon contraction. Therefore, data in which the first scramble is released from the data supplied from the network or antenna to the set top unit 50 are obtained from the descramble circuit 72. However, the second scramble process $S_A$ has been performed on the data by the scramble circuit 54.

Into the authentication/access controller 74 instead of the conventional IC card, a descramble key, a user's password, etc. are written by the service provider, and owning of the security module 70 including the authentication/access controller 74 means a kind of authentication.

In the set top unit 50, the descramble circuit 56 performs the second descramble process $D_B$ on the input data using a descramble key supplied from the key control circuit 62, and reproduces the original MPEG encoded digital image data. The output of the descramble circuit 56 are outputted into a user's terminal (image display unit, etc.), not shown, via the demultiplexer 58 and the MPEG decoder 60. The MPEG decoder 60 includes an analog/digital converter, and outputs an analog video signal.

Figure 3:
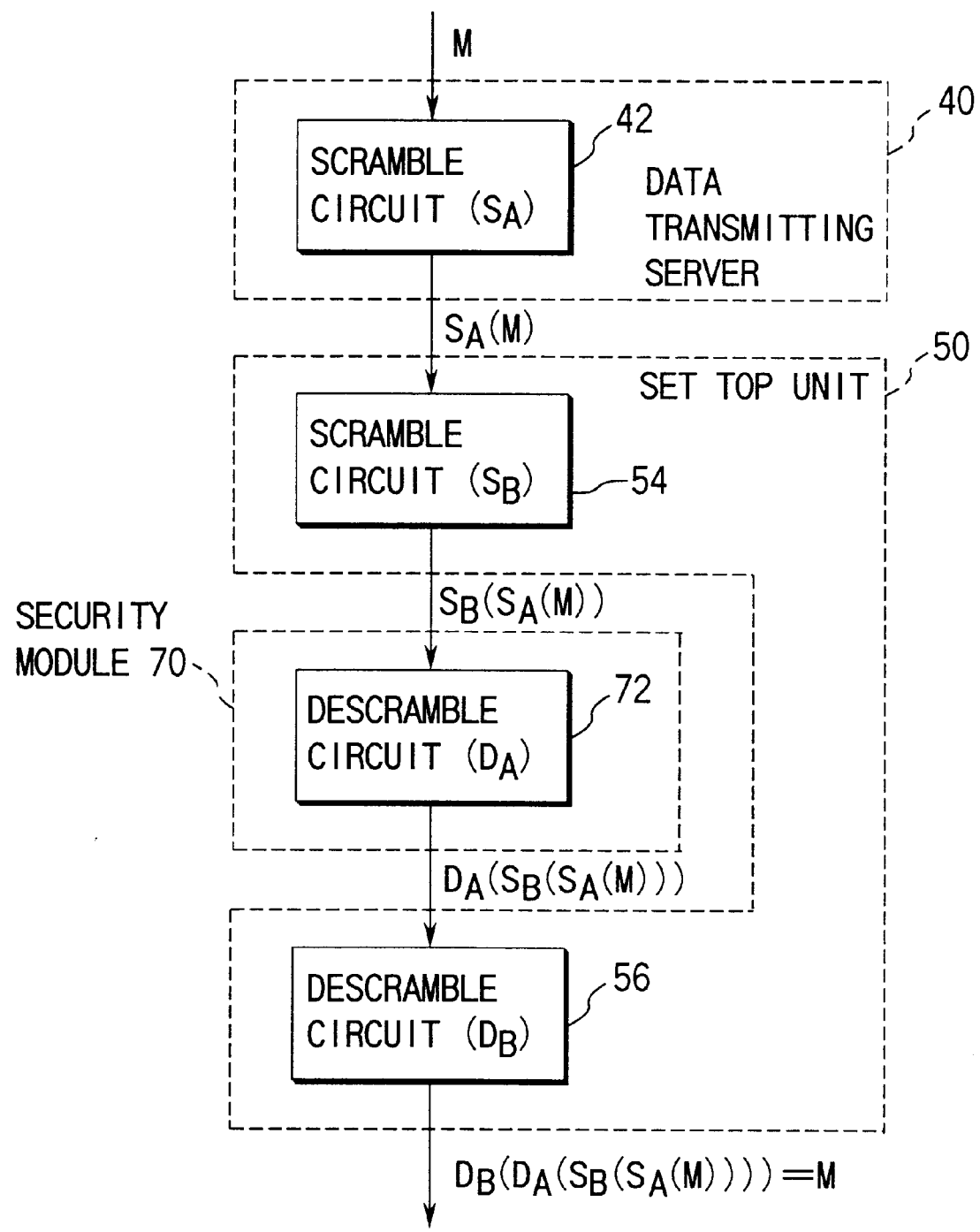
FIG. 3 is a schematic drawing explaining a function of the first embodiment.

The following describes an operation of the present embodiment with reference to FIG. 3. FIG. 3 shows only the scramble process and descramble process, and here, shows also a first scramble circuit 42 for performing the first scramble process $S_A$ in a server 40 of a service provider. When the original digital data is M, the first scramble circuit 42 in the server 40 outputs data $S_A(M)$ which have been scrambled according to the first method.

When this data is received by the set top unit 50, the second scramble circuit 54 performs the second scramble process $S_B$ on the data, and outputs data $S_B(S_A(M))$. Therefore, data, which have been duplex-scrambled according to the first and second scramble methods, are supplied from the set top unit 50 to the security module 70. Since even if the data are stolen by a third party, the data cannot be descrambled, the original data cannot be reproduced, and thus the original digital data cannot be utilized illegally.

The first descramble circuit 72 in the security module 70 performs the first descramble process $D_A$ on the duplex-scrambled data, and outputs data $D_A(S_B(S_A(M))) = S_B(M)$, and transmits the data $S_B(M)$ back to the set top unit 50. Therefore, data scrambled according to the second method are supplied from the security module 70 to the set top unit 50. Since even if the data are stolen by a third party, the data cannot be descrambled, the original data cannot be reproduced, and thus the original digital data cannot be utilized illegally. In particular, since the key for the second scramble process $S_B$ is generated by the key control circuit 62 in the set top unit 50, it does not leak outside, and illegal utilization of the original data by a third party can be prevented.

The second descramble circuit 56 in the set top unit 50 performs the second descramble process $D_B$ on the input data, and outputs data $D_B(D_A(S_B(S_A(M))))$. As described above, since the key control circuit 62 selects the second scramble/descramble key so that the second scramble process/descramble process $S_B$ and $D_B$ satisfy $D_B \cdot D_A \cdot S_B \cdot S_A = I$, the output data $D_B(D_A(S_B(S_A(M)))) = M$, and thus the descramble circuit 56 can reproduce the original data M. Here, the condition of $D_B \cdot D_A \cdot S_B \cdot S_A = I$ does not require the condition of $D_A \cdot S_A = D_B \cdot S_B = I$.

As described above, according to the present embodiment, since the original digital data do not appear in the interface between the set top unit 50 and the security module 70, the original data cannot be utilized (copied, etc.) illegally, and thus the service provider can be protected sufficiently. Further, since the interface does not exist between the IC card and the security module unlike the conventional example, the user's secrete data such as a password and a scramble key are not stolen by a third party.

Further, in order to improve the security, it is more efficient that the key control circuit 62 changes the scramble/descramble keys for the second method regularly/irregularly. Namely, by monitoring and cryptoanalyzing the data outputted from the set top unit 50, there is a few possibility of detecting the scramble/descramble keys for the second method. However, by making the keys variable and by updating the keys frequently, such a possibility can be substantially zero.

Figure 4:
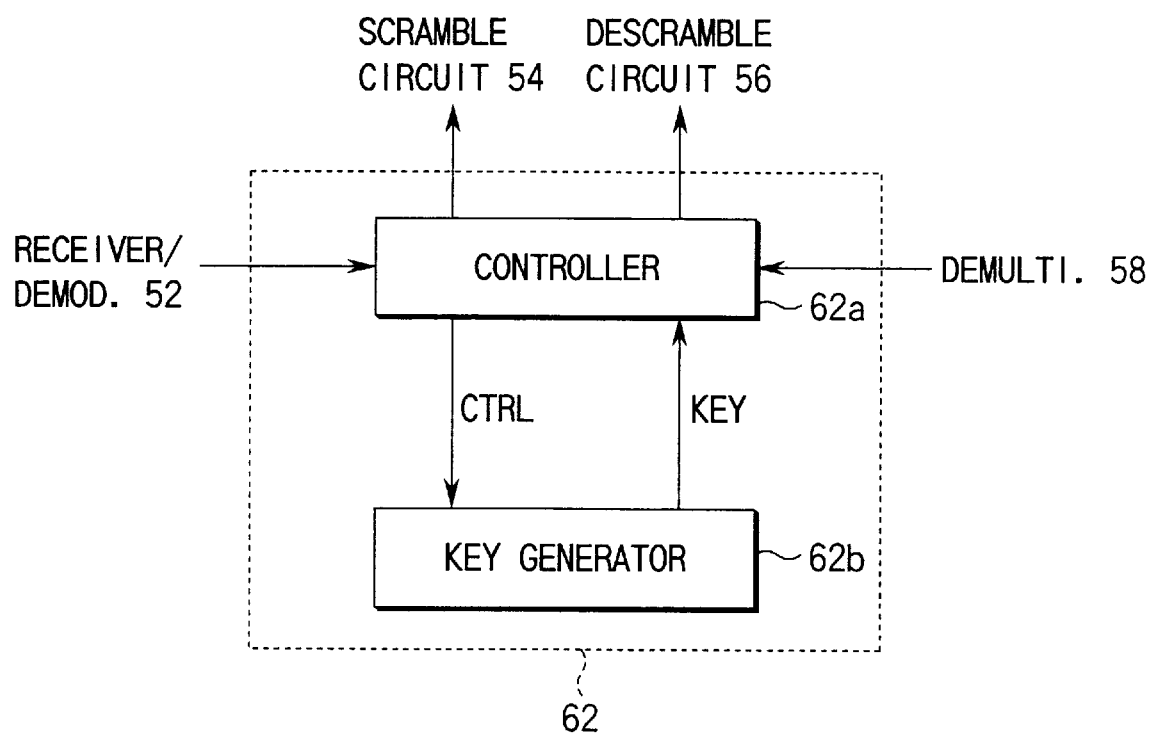
FIG. 4 is a block diagram showing details of the key control circuit of FIG. 2.

FIG. 4 is a detailed circuit diagram of the key control circuit 62. The key control circuit 62 comprises a key generator 62b for generating scramble/descramble keys and a controller 62a for controlling a key generation and a key update and for interfacing with other circuits.

The key generator 62b generates a new key in response to a key generation control signal from the controller 62a and supplies back the new key to the controller 62a. The key generator 62b includes a random number generator for generating a key. The controller 62a supplies parameters necessary for generating the random number, such as a seed for random number generation, the length of the key, and a restriction for the key. Alternately, the key generator 62b can have a function to obtain such parameters by itself.

The controller 62a instructs the key generator 62b to obtain the new keys and supplies the new keys to the scramble circuit 54 and the descramble circuit 56 to instruct them an update of key. If necessary, the controller 62a also supplies to the scramble circuit 54 and the descramble circuit 56 an information about a position in the stream data where a key is updated in the scramble circuit 54 and the descramble circuit 56.

Since the set top unit 50 is separated from the security module 70, the following effects are produced. The set top unit 50 can be commonly used by a plurality of users. Namely, only one set top unit 50 is arranged in a home, and each member of the family can own the peculiar security module 70. Moreover, it is considered that the scramble method varies with service providers, but in this case, by incorporating the descramble functions peculiar to the service providers into the security module, a user can cope with this case by using one set top unit 50.

Here, the above explanation refers to the scramble as the encryption, but the encryption is not limited to this, the encryption may be normal methods such as the RSA method and the DES method. Moreover, data supplied from a network are not limited to image data, they may be sound data, video data, etc. Further, the supply of data is applied not only to the case of the supply via a network but also to the case of the supply via a storage medium.

In the above embodiment, the descramble key is stored in the security module 70. However, it is possible to transmit the descramble key from the network to the security module 70 in an encrypted manner. When a hierarchical encryption is employed, the present invention can be applied if the decryption key of the uppermost layer of the hierarchical encryption is stored in the security module 70.

Other embodiments of the data receiving apparatus according to the present invention will be described. The same portions as those of the first embodiment will be indicated in the same reference numerals and their detailed description will be omitted.

In the first embodiment, since the original digital data do not appear in the interface between the set top unit 50 and the security module 70, the illegal utilization (copying, etc.) of the original digital data can be prevented, but recording an analog video signal supplied to a user's terminal into a video tape by a video cassette recorder, etc. cannot be prevented.

Meanwhile, as a technique for realizing the protection of a copyright and the prevention of the copying, there are a kind of data processing techniques such as data hiding, data insert, digital watermarking, and digital fingerprint. In each data processing technique, basically, specific data (characters, a figure, a mark, etc.) representing a copyright, for example, are concealedly inserted into digital image data such as an image to be protected. Even if the original digital image data are normally reproduced, the specific data cannot be confirmed with them being concealed, but they can be reproduced by a specific reproducing process.

When the data provider provides digital image data such as an image to a user, the data provider can insert the specific data representing a copyright into the digital image data, etc. by using such a data processing technique without notifying the user (in other words, without deteriorating the original image data, etc.). However, only when the specific data representing a copyright are inserted, the provided data are copied into a medium such as an optical disk, and thus there are still problems as to the actual effect in preventing illegal distribution.

Therefore, there considers a method of inserting identification (ID) data for identifying a user who is provided with data as the specific data. In this method, where data are copied illegally to be distributed, it becomes easy to specify a user who copied the data by reproducing its ID data. As a result, the provider can bring an action against the user who copied the data illegally and distributed them, thereby making it possible to effectively realize the protecting of rights of the data provider.

However, where as the data distributing system, particularly a system of transmitting data to many and unspecified users such as a computer network and a digital broadcasting network is assumed, it is practically difficult to insert ID data per user.

Second Embodiment

Therefore, as the second embodiment, it will be described an embodiment which can easily insert ID data into provided data per user even if the data service system of transmitting data to many and unspecified users is used, and, as a result, which can securely protect rights such as a copyright of a data provider.

Figure 5:
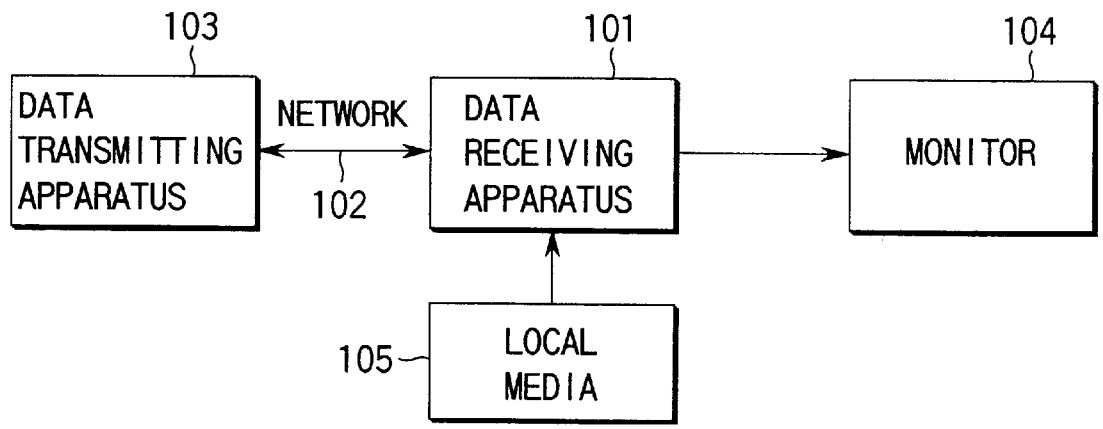
FIG. 5 is a block diagram showing a whole system including the data receiving apparatus according to a second embodiment of the present invention.
Figure 7:
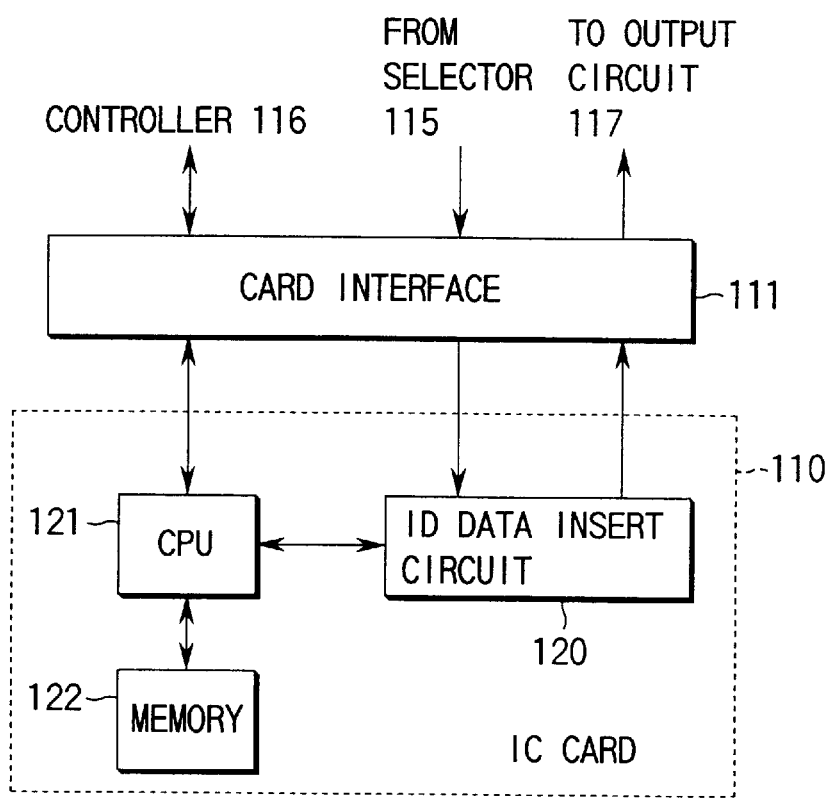
FIG. 7 is a block diagram showing an IC card according to the second embodiment.
Figure 6:
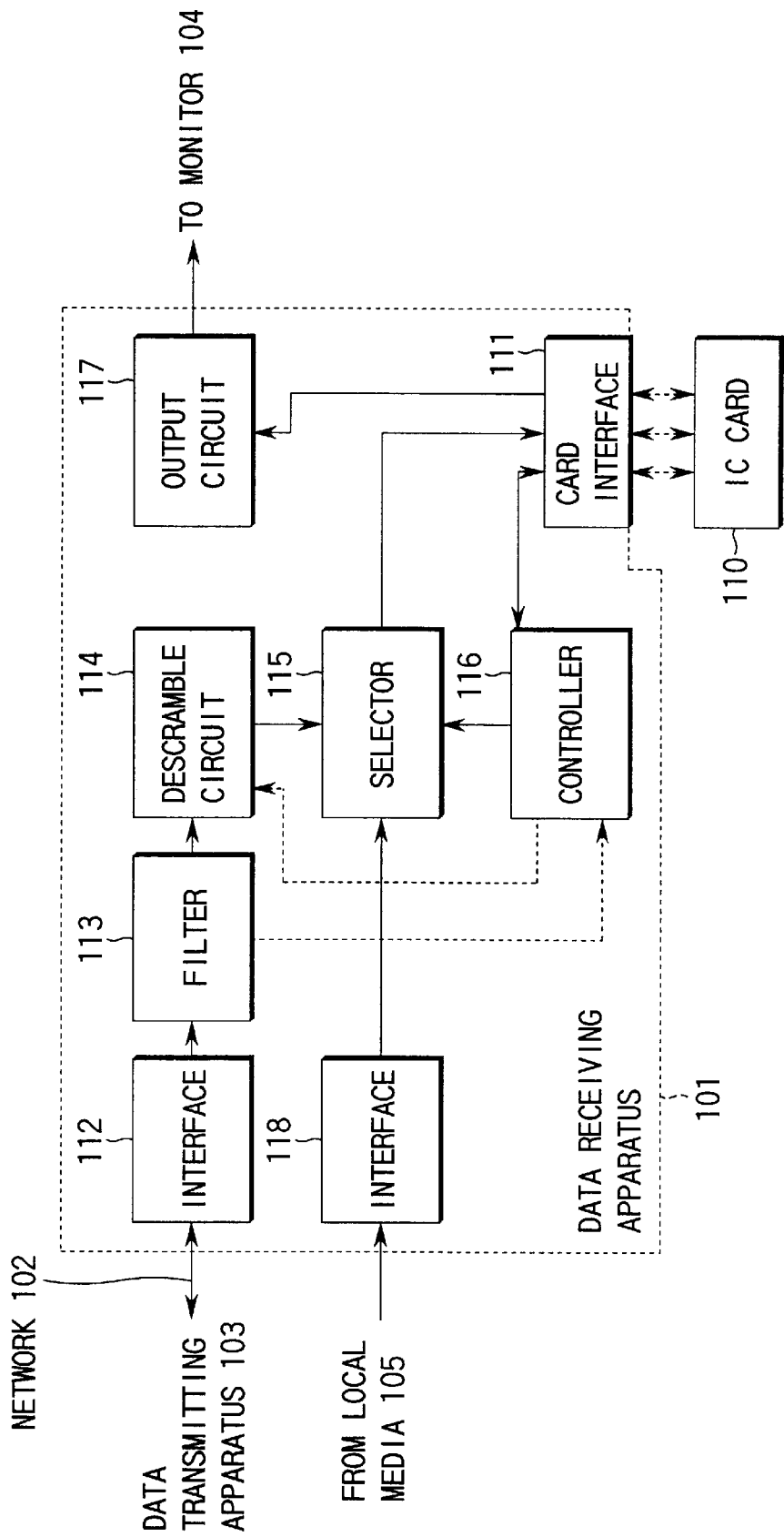
FIG. 6 is a block diagram showing the data receiving apparatus according to the second embodiment.

FIG. 5 is a block diagram showing a constitution of the whole data communication system according to the present embodiment, FIG. 6 is a block diagram showing a main section of the data receiving apparatus relating to the second embodiment, and FIG. 7 is a block diagram showing a constitution of the IC card used together with the data receiving apparatus according to the second embodiment.

According to the present embodiment, as shown in FIG. 5, the data service system in which a data transmitting apparatus 103 is connected to the data receiving apparatus 101 via a network 102 is assumed. The network 102 may be a digital broadcasting network for a computer network (internet) and digital satellite broadcasting. The data transmitting apparatus 103 is assumed as an apparatus in the side of data service provider who provides various data (so-called multimedia data) including an image.

The data receiving apparatus 101 is a receive only apparatus set per user such as a home, and it is a main element of a data reproducing apparatus including the IC card 110, a monitor 104 and a local media 105, described later. The monitor 104 is, for example, a personal computer or a television receiver having a display device and if necessary, other reproducing devices such as a loudspeaker. The local media 105 includes a media drive for reproducing data which have been recorded by driving a data medium such as an optical disk, and more specifically, a CD-ROM drive or DVD (Digital Versatile Disk) drive or a storing media such as a semiconductor memory device.

As shown in FIG. 6, the data receiving apparatus 101 has an interface 112 for connection with the network 102, an interface 118 for connection with the local media 105 and a card interface 111 for connection with the IC card 110. Data supplied from the network 102 via the interface 112 are supplied to a first input terminal of a selector 115 via a filter 113 and a descramble circuit 114. Data supplied from the local media 105 via the interface 118 are supplied to a second input terminal of the selector 115. Data supplied from the IC card 110 via the card interface 111 are supplied to the monitor 104 via an output circuit 117. A controller 116 is connected to the card interface 111, and the selector 115 is controlled by the controller 116.

The filter 113 is a circuit for extracting predetermined control data from multiplexed data transmitted via the network or necessary data from a multiprogram. The descramble circuit 114 performs a descramble process (a kind of decrypt process) for reproducing data which have been subject to predetermined scramble process (a kind of encrypt process) to an original state.

The selector 115 is a selecting circuit for selecting one of received data from the network and output data from the local media 105 under control of the controller 116. The controller 116 is a control apparatus of the receiving apparatus 101, and it recognizes the received data from the network or the output data from the local media 105 through, for example, a switch, not shown, provided to the receiving apparatus 101, and controls the selector 115 according to the recognized result. Here, as to the method of controlling the selector 115, besides the aforementioned one, a method of first selecting received data from the network may be used in the case of stopping the local media 105, or the controller 116 may control the controller 115 according to a selecting signal from a personal computer or a television receiver as the monitor 104.

The output circuit 117 includes a D/A converting circuit for converting digital data, which is the receiving data from the network or the output data from the local media, into an analog signal, or a CVS converting circuit for converting the digital data into a composite video signal which is supplied to the television receiver, they converts provided data into a reproducing signal for reproduction on the monitor 104. The card interface 111 includes a card slot for connection with the IC card 110, described later, the card slot connects the IC card 110 with the controller 116, selector 115 and the output circuit 117 in the receiving apparatus 101.

The IC card 110 is prepared for each user, and it contains, as shown in FIG. 7, a microprocessor (CPU) 121 which forms the controller, a memory 112 and a data insert circuit 120. The CPU 121 is connected to the controller 116 in the receiving apparatus 101 side via the card interface 111, and it outputs, for example, user ID data, and controls the ID data insert circuit 120.

The ID data insert circuit 120 is a circuit dedicated to concealedly inserting ID data previously set per user into the data outputted from the selector 115 via the card interface 111. Namely, the ID data insert circuit 120 performs data processing algorithm which is called as the conventional data hiding, data insert, digital watermarking or digital fingerprint, and the ID data insert circuit 120 concealedly inserts, for example, ID data for identifying a user and stored in the memory 122 into provided data. The memory 122 is, for example, a rewritable ROM (Read Only Memory), and is accessed by the CPU 121 and supplies the ID data to the ID data insert circuit 120. Here, it is desirable that the IC card 110 is arranged so that the ID data stored by the memory 122 is prevented from being easily changed by a user's operation, or so that the algorithm used by the ID data insert circuit 120 is prevented from being easily analyzed by a user's operation (tamper resistance module structure).

The data receiving apparatus 101 transfers data (digital data into which ID data have been inserted) outputted from the IC card 110 via the card interface 111 into the output circuit 117. The output circuit 117, as described above, converts the digital data into which the ID data have been inserted by the ID data insert circuit 120 into an analog signal or a composite video signal with respect to the television receiver.

Figure 8:
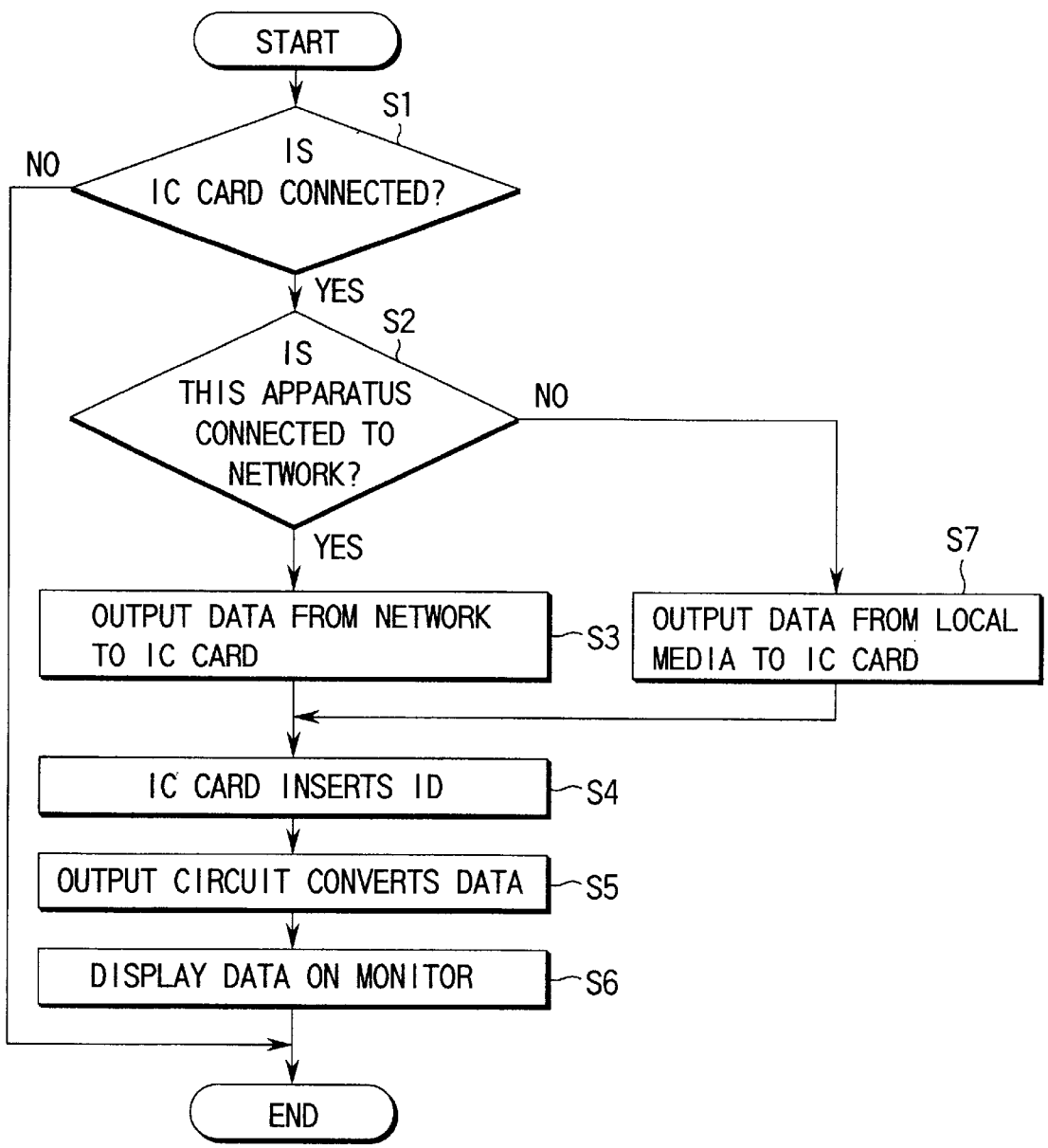
FIG. 8 is a flow chart of the second embodiment.

The following describes the operation of the present embodiment with reference to the flow chart in FIG. 8.

The data reproducing apparatus of the present embodiment is arranged so as to be operable by connecting the IC card 110 to the receiving apparatus 101 (step S1). Namely, when the controller 116 of the receiving apparatus 101 detects the connection of the IC card 110 via the card interface 111, it starts to receive and reproduce data based on the user's ID data from the IC card 110. The IC card 110 is supplied only to a user who contracts with the data service provider in the data transmitting apparatus 103 side, and the ID data for identifying the user are previously stored into the memory 122. According to the present embodiment, as the data transmitting apparatus 103, a digital broadcasting network which always originates multimedia data such as an image to many and unspecified users, or a system of providing multimedia data (video on demand) such as a movie according to a request from the user via the computer network is assumed.

When the IC card 110 is mounted to the card interface 111 by the user, the controller 116, as described above, recognizes as to whether the data to be reproduced are the received data from the network 102 or the output data from the local media 105 (step S2). Here, it is assumed that the case where the received data from the network 102 are reproduced (YES of step S2).

The data receiving apparatus 101 receives data transmitted from the data transmitting apparatus 103 via the network 102 at the interface 112, and the data goes through signal processing systems such as the filter 113 and the descramble circuit 114 so as to be transmitted to the selector 115. The controller 116 outputs the received data (digital image data, etc.) from the data transmitting apparatus 103 selected by the selector 115 to the ID data insert circuit 120 of the IC card 110 via the card interface 111 (step S3).

In the IC card 110, the ID data insert circuit 120 inserts the ID data stored in the memory 122 into the digital image data which are data outputted from the receiving apparatus 101 according to control of the CPU 121.

Figure 9:
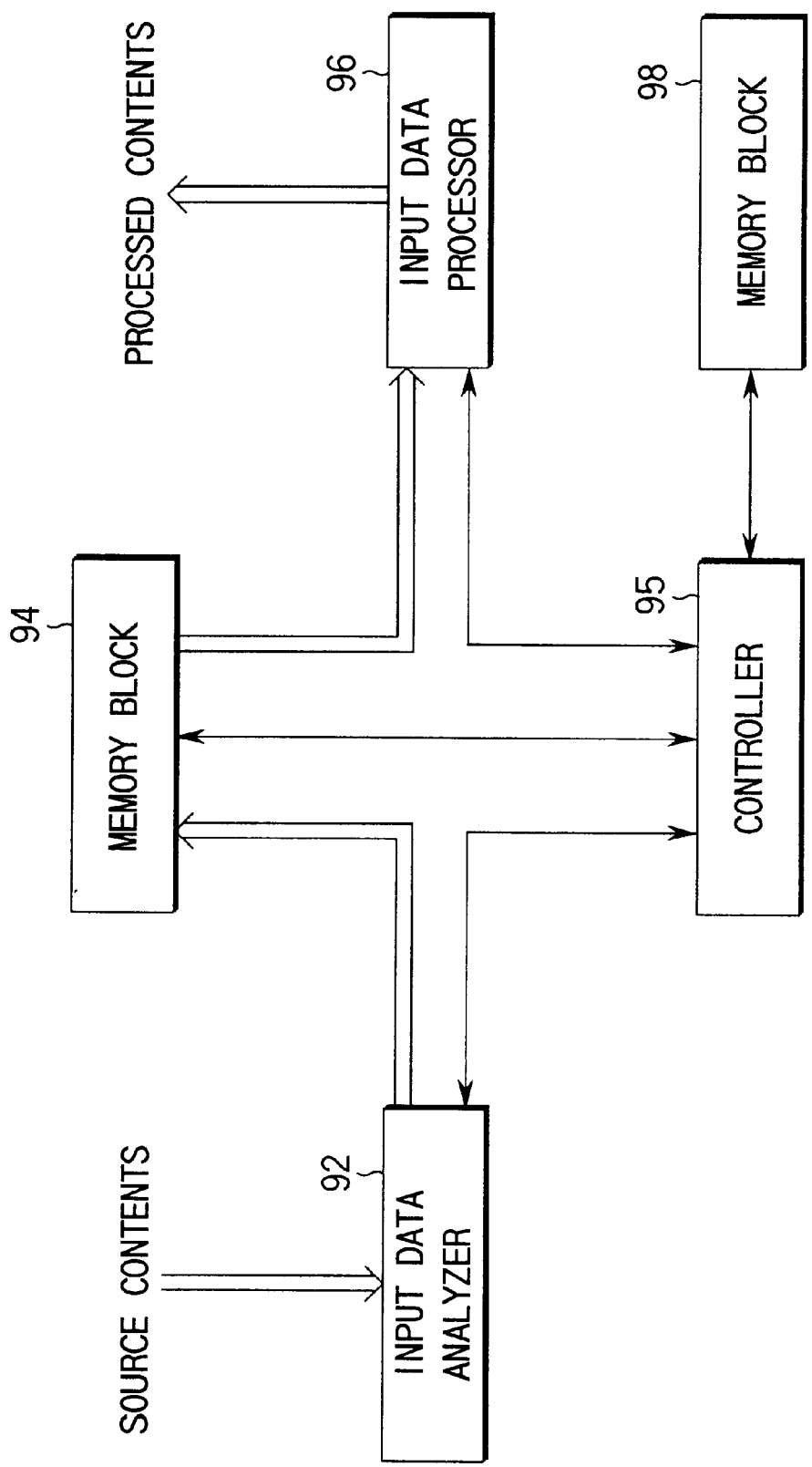
FIG. 9 is a block diagram showing a fingerprint circuit of the second embodiment.

One example of the data insert circuit 120 is shown in FIG. 9. This example is a circuit for inserting the ID data into digital image data which has been encoded by MPEG method. The MPEG data is divided into two data; one is for describing the image itself (such as pixel data, motion vector data) and the other. FIG. 9 shows an example in which the ID data is inserted into the pixel data.

Source contents supplied from the card interface 111 is input to an input data analyzer 92 in which a data structure of a data block is analyzed in two steps. First, it is determined whether or not the data block is the MPEG data block. If the data block is the MPEG data block, then, it is determined whether or not the data block is the pixel data block. If the data block is the pixel data block, the data block is so stored in a memory block 94 that it can be separated in a unit of one expression value (a luminance value or a chrominance value of one pixel) of one expression unit (e.g., one pixel) and it can be accessed by an input data processor 96 and a controller 95 in a unit of one expression value.

The memory block 94 stores the result of analysis which can be read by the input data processor 96 and the controller 95. The controller 95 controls the ID data insert circuit 120 as a whole and interfaces with other circuits. Functions of the controller 95 include a control of start/stop of the operation of the input data analyzer 92, a read/write control of the memory blocks 94 and 98, an instruction to the input data processor 96 relating to the insert data and the data insert position, and data processing operation for ID data stored in the memory block 98. As described above, the memory block 98 stored the ID data.

The ID data is read by the controller 95 and supplied to the input data processor 96 after being processed such as encrypted. The controller 95 instructs the input data processor 96 of the ID data and the insert position. The input data processor 96 reads data from the memory block 98 and processes it. The position of data to be processed is instructed by the controller 95. The controller 95 accesses the memory block 98 and scans the data region which is determined as the pixel data block by the input data analyzer 92. The controller 95 determines the insert position using a function f which can uniquely determine the insert position based on a parameter which is a pixel value obtained by the above scanning. The determined insert position is supplied to the input data processor 96.

The input data processor 96 reads data from the memory block 98 and performs a data insertion operation if the data is one expression unit (one pixel) and does not if it is not. The output of the input data processor 96 is supplied to the card interface 111. Data insertion into one expression unit (one pixel) is performed as follows. An expression value for one bit is inserted into one expression unit of data. If the expression value for one bit is 0, the data is not changed and is supplied to the card interface 111 as it is. If the expression value for one bit is 1, that expression value is replaced with an expression value which is most similar to the expression value of an object to be processed and the replaced value is output to the card interface. There is defined a relation between the expression value for each expression block and at least one (not all) possible value of the expression value. The replacement of the expression value means that at least one possible value of the expression value for each expression block is selected based on this relation. In one practical example, the luminance value or chrominance value of the object pixel is replaced with at least one luminance value or chrominance value having a minimum difference value (absolute value) with the luminance value or chrominance value of the object pixel. If there are plural expression values which are most similar to the expression value of the object pixel, one having the minimum absolute value is selected.

Returning to FIG. 8, the IC card 110 supplies the digital image data, etc. into which the ID data have been inserted to the output circuit 117 of the data receiving apparatus 101 via the card interface 111 (step S4).

The output circuit 117 converts the multimedia data such as the digital image data into which the ID data have been inserted into an analog signal or a composite video signal so as to output the signal into the monitor 104 (step S5). On a display screen of the television receiver, for example, which is the monitor 104, an image transmitted from the network is reproduced (step S6).

Meanwhile, when the output data from the local media 105 is reproduced, the controller 116 outputs the digital image data, etc. outputted from the local media 105 by the selector 115 into the IC card 110 via the card interface 111 (step S7). The local media 105, as described above, is a drive for reproducing a movie image and a still image which have been previously recorded in an optical disk, etc. so as to output them. Here, the data processing after transmission to the IC card 110 is the same as the case of the reproduction of data from the network (step S4 through step S6).

As described above, according to the present embodiment, the IC card 110 is prepared for each user, the ID data for identifying the user are concealedly inserted into the provided data such as the digital image data by the ID data insert circuit 120 built in the IC card 110. Therefore, if the user copies the reproduced data into a recording medium and distributes it illegally, the user who copied the data can be specified by reproducing the user's ID data, and thus the illegal copies can be eliminated.

Only when the user mounts the IC card 110 supplied upon the contraction with the data service provider to the data receiving apparatus 101, the user can reproduce desired multimedia data using a personal computer and a television receiver without being conscious of the process for inserting the ID data. Therefore, when the data service provider provides data via a computer network and a digital broadcasting network, the process for inserting the ID data can be eliminated. The data service provider does not have to perform the data inserting process. As a result, like the computer network and digital broadcasting network, the construction of the data service system for providing data to many and unspecified users can be easily realized. Therefore, by the ID data inserting process, the protection of the rights such as a copyright of the data providers can be improved, and the efficiency of distribution of the data service can be improved.

In addition, also when data are reproduced from the local media 105, it is not necessary to provide the ID data insert function to the local media 105. Therefore, the rights such as a copyright of the data providers who provide data via the local media 105 can be protected without preparing special local media 105.

Here, the present embodiment refers to the function for inserting the ID data into data in the IC card 110, but also specific data representing a copyright of data creators and providers may be inserted thereinto. Moreover, besides the user's ID data, for example, date, specific sort data, etc. may be inserted thereinto.

It is possible to supply the output of the output circuit 117 to a storing device of multimedia data in stead of a reproducing device of multimedia data, such as the monitor 104. Further, it is possible to output digital data before D/A conversion from the output circuit 117 in stead of analog data. These modifications can be applied to the following embodiments.

Third Embodiment

Figure 10:
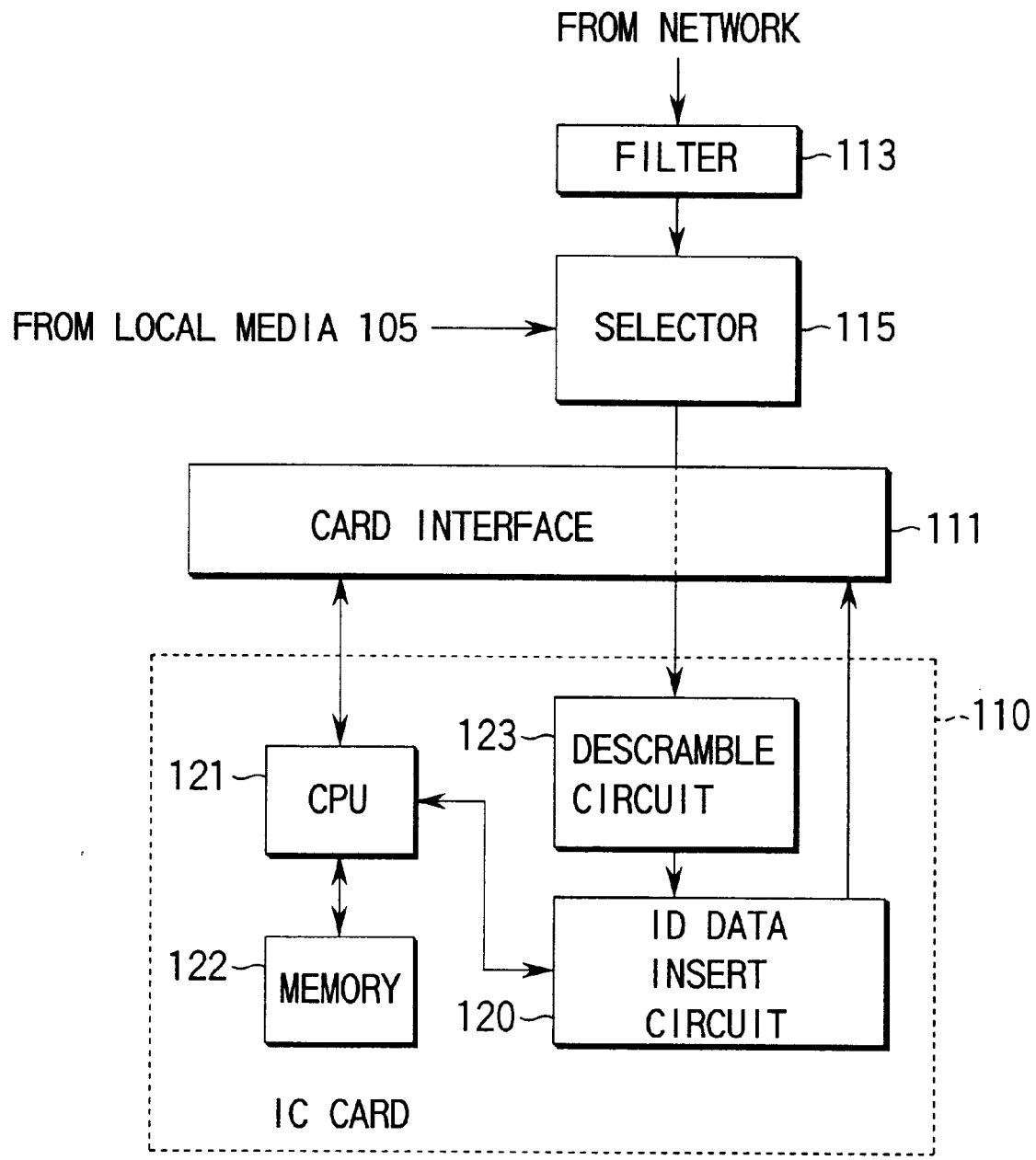
FIG. 10 is a block diagram showing the data receiving apparatus according to a third embodiment of the present invention.

The following describes the first modified example of the second embodiment as the third embodiment. As shown in FIG. 10, in the third embodiment, a descramble circuit 123 is added as a component of the IC card 110 in the second embodiment. In this case, needless to say, the descramble circuit 114 in the data receiving apparatus 101 can be omitted. Therefore, the arrangement of the data receiving apparatus 101 can be simplified, and the cost can be reduced. Moreover, by providing the descramble circuit 123 to the IC card 110 side, when scrambled data are provided from the data transmitting apparatus 103, the user without the IC card 110 cannot release the scramble, and thus the rights of the data service provider can be protected more efficiently. The scramble algorithm can also be easily updated by merely replacing the IC card 110. Here, the descramble circuit may be double-arranged by the descramble circuit 114 provided to the data receiving apparatus 101 and the descramble circuit 123 of the IC circuit 110, namely, the descramble circuit 114 in the data receiving apparatus 101 side is not omitted.

Fourth Embodiment

In the second embodiment, the ID data insert circuit 120 performs the data insert process for concealedly inserting ID data according to data processing algorithm previously stored into the IC card 110. On the contrary, the data processing algorithm is not necessary to be previously stored in the IC card 110, and algorithm for the data insert process may be included in data which are received by the data receiving apparatus 101 from the data transmitting apparatus 103, and the IC card 110 may download also the algorithm for the data insert process. The following describes the fourth embodiment having the above arrangement. However, since the arrangement of the fourth embodiment is the same as that of the second embodiment, the detailed description is omitted.

Namely, the CPU 121 of the IC card 110 shown in FIG. 7 receives the algorithm for the data insert process from the data receiving apparatus 101, and downloads it to the memory 122 or an internal memory of the ID data insert circuit 120. The ID data insert circuit 120 performs the data insert process for concealedly inserting ID data according to the downloaded algorithm for the data insert process.

In this method, the algorithm for the data insert process is not fixed, and the method of the data insert process can be easily updated and changed as occasion demands. Moreover, the ID data insert circuit 120 in the IC card 110, which is standardized so that not specific algorithm for the data insert process but algorithm set externally is performed, can be used. Therefore, the standardization of the IC card 110 becomes easy, and the data insert process according to special algorithm provided by the data provider can be performed. Therefore, the rights such as a copyright can be protected more efficiently.

Fifth Embodiment

Figure 11:
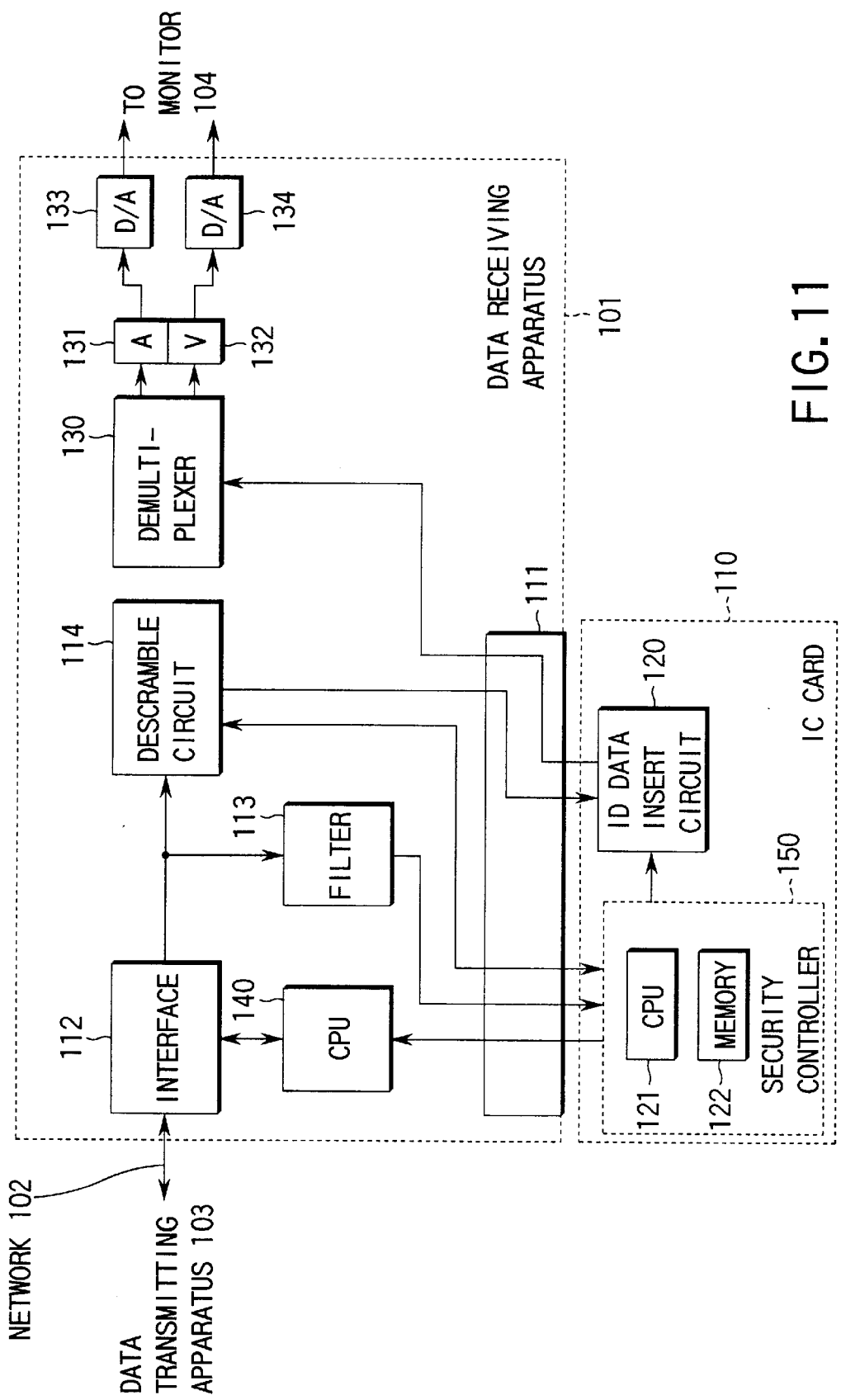
FIG. 11 is a block diagram showing the data receiving apparatus according to a fifth embodiment of the present invention.

FIG. 11 is a block diagram relating to the fifth embodiment.

The IC card 110 of the present embodiment performs the identification process of a user (method limiting a receiving person and which is called as conditional access) in the conventional data service, so the IC card 110 includes a security controller 150. The security controller 150 comprises the CPU 121 and the memory 122 shown in FIG. 7 as hardware.

Here, the user's identification process is of identifying a user who contracts with the data service provider by using the IC card 110, and more concretely, it is a process for decrypting key data (key data for decrypting scrambled encrypted data) necessary for an operation of the descramble circuit 114 and outputting them so that the transmitted data is descrambled. Namely, the data transmitting apparatus 103 transmits scrambled (a sort of encrypted) data via the network 102 by using the scramble key data. The data receiving apparatus 101 decrypts original data from received data through the descramble circuit 114. At this time, the security controller 150 of the IC card 110 decrypts the scrambled key data from control data which are separated from the received data by the filter 113, and outputs the scramble key data to the descramble circuit 114. The descramble circuit 114 decrypts the original data from the scrambled data using the scramble key data supplied from the IC card 110.

In such a user's identification process, the security controller 150 of the IC card 110 decrypts the scramble key data using the ID data corresponding to a master key data set per card (namely, per user). Namely, the data transmitting apparatus 103 encrypts the scramble key data according to the master key data, and multiplexes the data into data to be transmitted.

According to the present embodiment, as shown in FIG. 11, after the IC card 110 is connected to the data receiving apparatus 101, the security controller 150 supplies the ID data necessary for the user's identification process (control of the descramble circuit 114) to the ID data insert circuit 120. Namely, after the security controller 150 performs the user's identification process and identifies that the user is accepted as the data receiving person, the security controller 150 supplies the ID data to the ID data insert circuit 120. However, before the user's identification process, the security controller 150 may supply the ID data to the ID data insert circuit 120. In this case, needless to say, when the user is not accepted as the data receiving person according to the user's identification process, the data cannot be descrambled. Therefore, it becomes meaningless that the ID data are supplied to the ID data insert circuit 120.

The ID data insert circuit 120 concealedly inserts the ID data supplied from the security controller 150 into data supplied from the descramble circuit 114. The security controller 150 may supply an algorithm for the insert process downloaded from the data receiving apparatus 101 or an algorithm for the insert process which is previously stored in the internal memory to the ID data insert circuit 120.

The other arrangement is basically the same as that shown in FIG. 6, but is different from that in FIG. 6 in that a multiplex signal outputted from the descramble circuit 114 is separated by a demultiplexer 130 into a digital video signal and an audio signal, for example. A detecting circuit 131 of the audio signal extracts an audio signal from the output of the demultiplexer 130 and outputs it to a D/A converter 133. A detecting circuit 132 of the video signal extracts a video signal from the output of the demultiplexer 130 and outputs it to a D/A converter 134. The D/A converters 133 and 134 convert the video and audio signals into analog signals and outputs the analog signal into the monitor 104.

Sixth Embodiment

Figure 12:
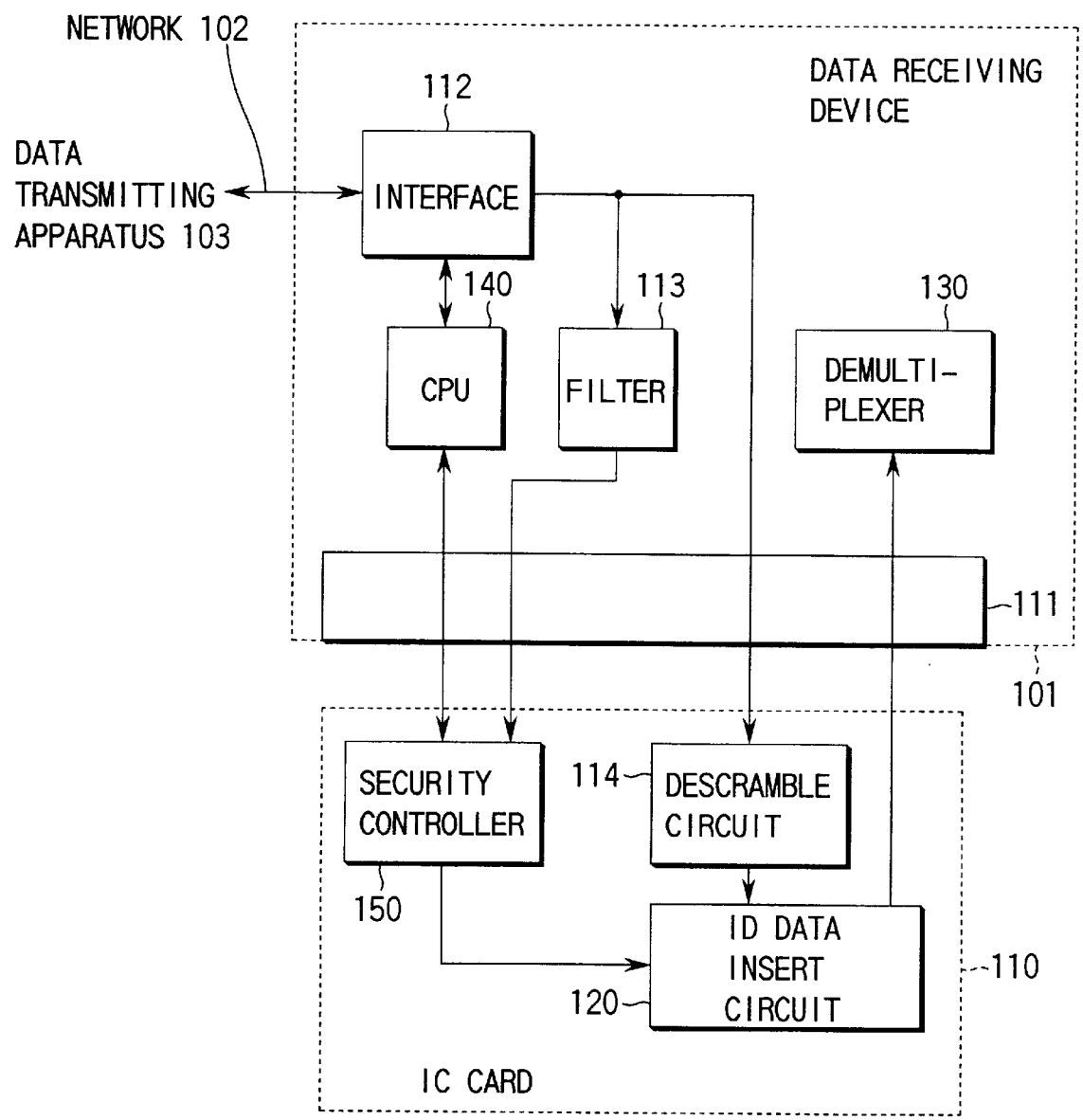
FIG. 12 is a block diagram showing the data receiving apparatus according to a sixth embodiment of the present invention.

As shown in FIG. 12, in the sixth embodiment, the descramble circuit 114 which is provided in the data receiving apparatus 101 in the fifth embodiment is located in the IC card 110, and thus the sixth embodiment corresponds to the third embodiment (step See FIG. 10).

When the algorithm for the scramble process in the data transmitting apparatus 103 is updated, accordingly it is necessary to update the algorithm of the descramble circuit 114, but in such an arrangement, only the specification of the IC card 110 is changed. In the arrangement that the descramble circuit 114 is provided to the data receiving apparatus 101, the descramble circuit 114 of the data receiving apparatus 101 should be updated according to the updating of the algorithm for the scramble process, and actually, the data receiving apparatus 101 itself should be updated. However, according to the sixth embodiment, this can be unnecessary.

Seventh Embodiment

Figure 13:
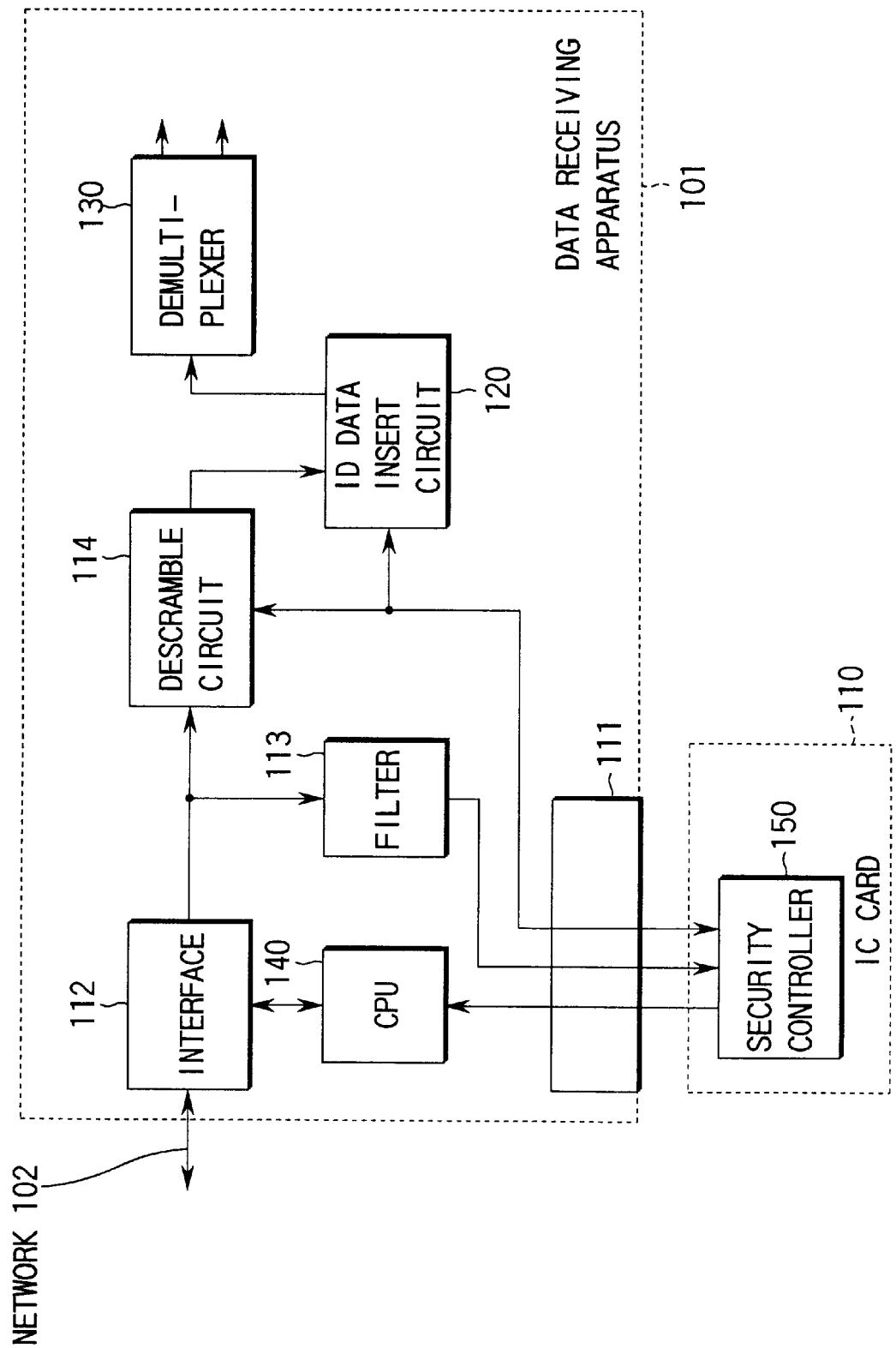
FIG. 13 is a block diagram showing the data receiving apparatus according to a seventh embodiment of the present invention.

As shown in FIG. 13, in the seventh embodiment, the ID data insert circuit 120 which is provided in the IC card 110 in the above-mentioned embodiments is located in the data receiving apparatus 101. The ID data insert circuit 120 concealedly inserts ID data supplied from the security controller 150 in data supplied from the descramble circuit 114.

In this case, the ID data insert circuit 120 may previously store the algorithm for the insert process, or be given with the algorithm for the insert process by the security controller 150. Moreover, the algorithm for the insert process may be downloaded from the data transmitting apparatus 103 via the data receiving apparatus 101 to the security controller 150, and then may be supplied to the ID data insert circuit 120. Further, the algorithm for the insert process is previously stored in the data receiving apparatus 101, and is downloaded to the security controller 150. Thereafter, the algorithm may be supplied to the ID data insert circuit 120. The other arrangement is the same as that in the aforementioned fifth embodiment.

Eighth Embodiment

Figure 14:
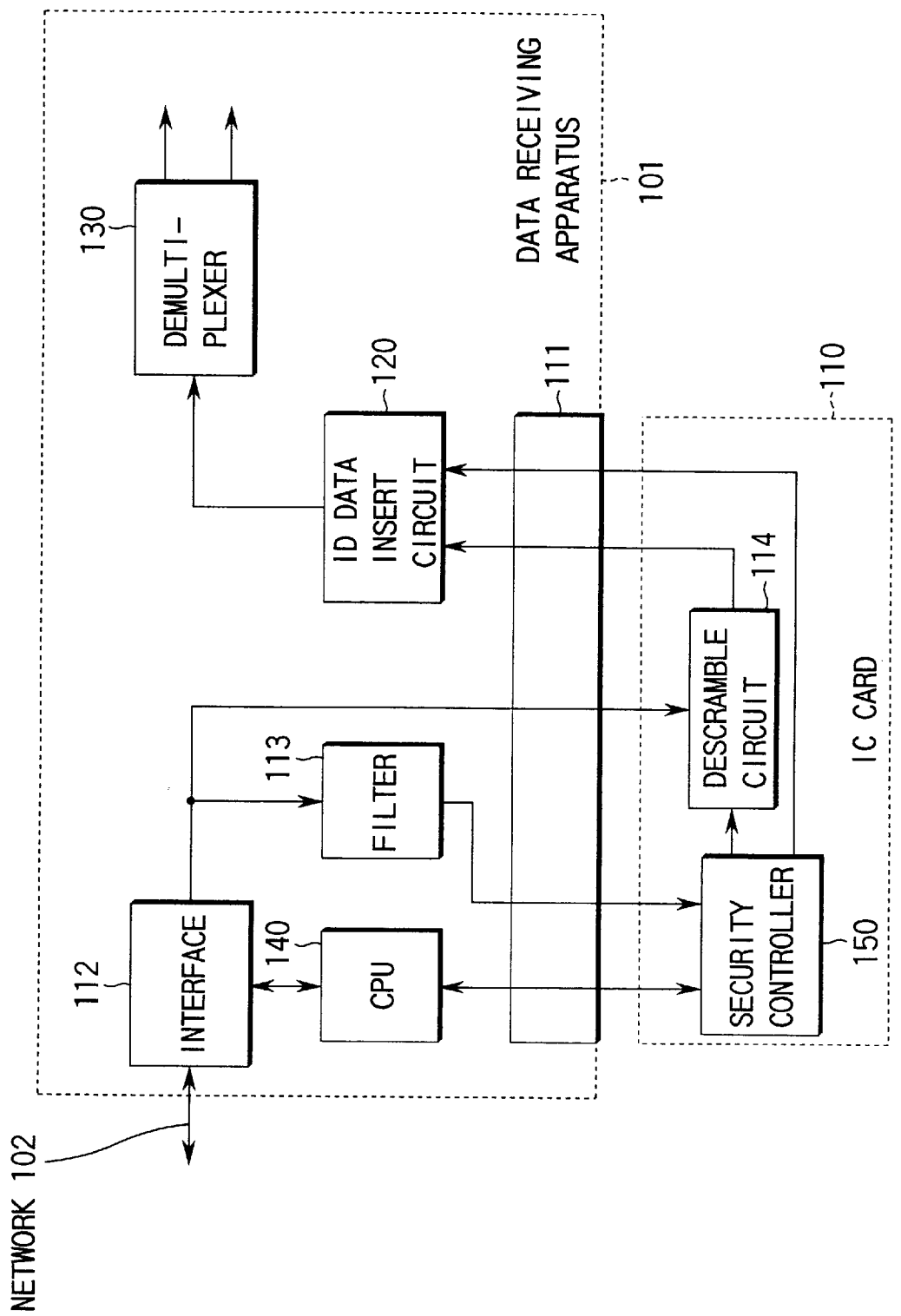
FIG. 14 is a block diagram showing the data receiving apparatus according to an eighth embodiment of the present invention.

As shown in FIG. 14, in the eighth embodiment, the descramble circuit 114 which is provided in the data receiving apparatus 101 in the seventh embodiment is located in the IC card 110. Therefore, the data receiving apparatus 101 transfers data received from the interface 112 to the descramble circuit 114 of the IC card 110, data are descrambled therein and are outputted thereinto. The ID data insert circuit 120 concealedly inserts ID data supplied from the security controller 150 into data supplied from the descramble circuit 114 of the IC card 110. The other embodiment is the same as that of the aforementioned fifth embodiment.

Ninth Embodiment

Figure 15:
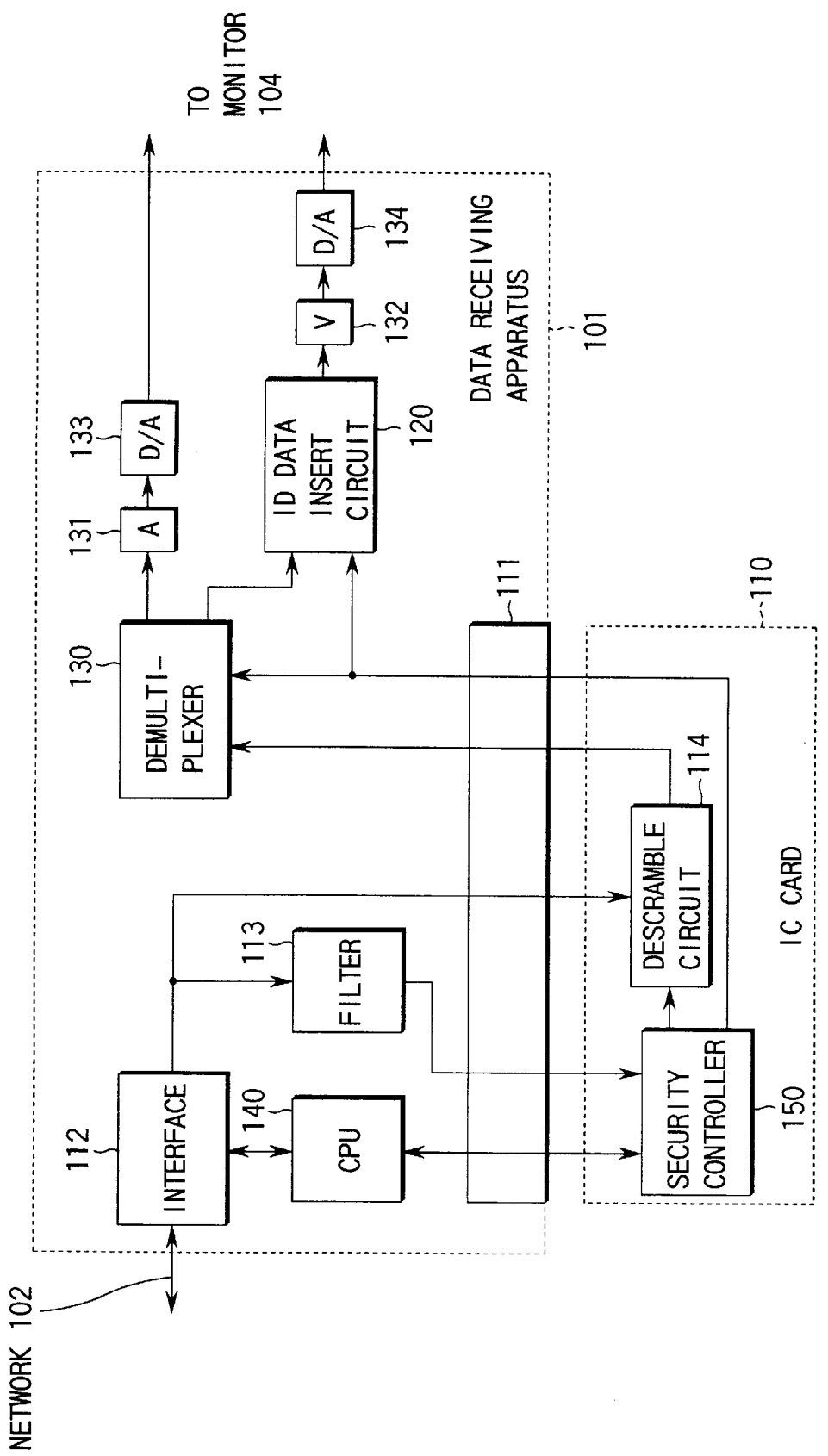
FIG. 15 is a block diagram showing the data receiving apparatus according to a ninth embodiment of the present invention.

As shown in FIG. 15, in the ninth embodiment, the ID data insert circuit 120 which is provided in the ID card 110 in the eighth embodiment is located in the output side of the demultiplexer 130. Namely, the ID data insert circuit 120 concealedly inserts ID data supplied from the security controller 150 into video data which have been obtained by separating a multiplex signal by the demultiplexer 130.

According to such an arrangement, the ID data insert circuit 120 does not require a function for detecting an image from data in which a sound and an image are multiplexed, so it can concealedly insert ID data into the image data efficiently (at a high speed). The other arrangement is the same as that in the fifth embodiment.

Tenth Embodiment

Figure 16:
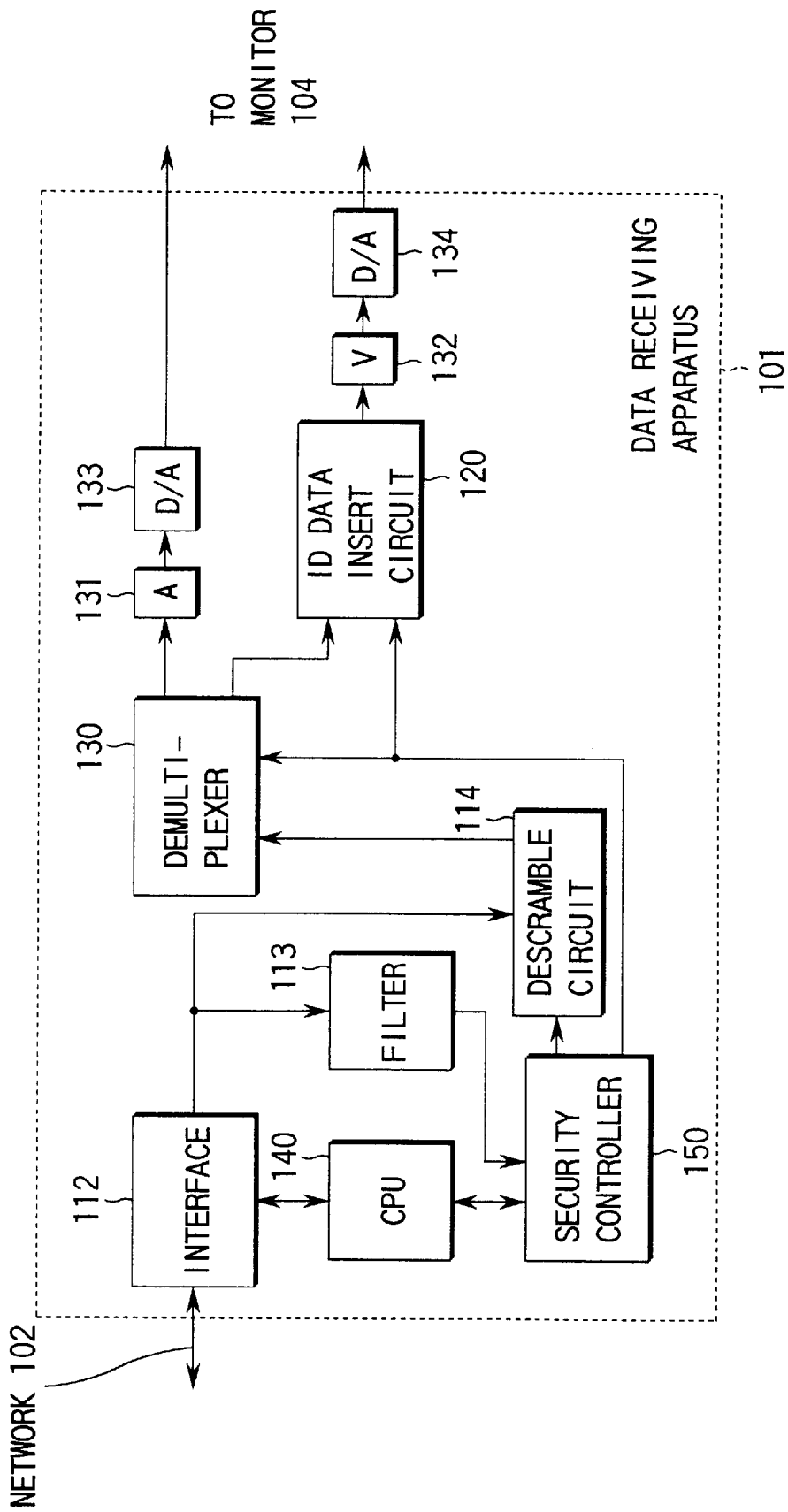
FIG. 16 is a block diagram showing the data receiving apparatus according to a tenth embodiment of the present invention.

As shown in FIG. 16, in the tenth embodiment, the security controller 150 and the ID data insert circuit 120 are located in the data receiving apparatus 101 without using the IC card 110 in the ninth embodiment.

According to this embodiment, the data receiving apparatus 101 should be different per user, but there is an advantage that an operation for managing the IC card 110 by the data provider is not required. The operations of the security controller 150 and the ID data insert circuit 120 are the same as those in the ninth embodiment.

Moreover, according to the present embodiment, the ID data insert circuit 120 is located in the output side of the demultiplexer 130, and the ID data insert circuit 120 inserts ID data into a video signal which is an output of the demultiplexer 130. However, the arrangement of the present embodiment is not limited to this. Namely, the ID data insert circuit 120 may be located between the descramble circuit 114 and the demultiplexer 130, and insert the ID data into data descrambled according to the descramble circuit 114. Moreover, the ID data insert circuit 120 may be located in the output side of the demultiplexer 130 and insert the ID data into an audio signal which is an output of the demultiplexer 130 (namely, located between the demultiplexer 130 and the detecting circuit 131 of an audio signal).

Eleventh Embodiment

Multimedia data are communicated by multiplexing video data and audio data according to the system specification of the MPEG-2, for example, as a stream data which is a coded (compression-coded) bit stream (stream data). Where the data insert process (hereinafter, referred to as FP process as an abbreviation of the fingerprint process) in the user's side, normally coded stream data is subject to the decode process (expansion-decoding process) before inserting a mark.

In an electronic watermark printing, data which is inserted into stream data is called as "mark". The mark may be an identification data for specifying the user, a copyright, or other information or other data. The process for inserting a mark which identifies the user is called a fingerprint processing.

The reason why the coded stream data is decoded before mark insertion, is that it is difficult to determine a suitable position into which a mark is inserted in a coded bit stream. Namely, when a mark is inserted into a stream data by the FP process, image quality of contents data is deteriorated depending on an insert position. Moreover, a position where a mark cannot be inserted by the FP process according to syntax exists in the stream data. Therefore, when a mark is inserted into a stream data by the FP process, normally, a mark is inserted into a decoded stream data, and the stream data into which the mark has been inserted is subject to the compression-coding process again.

However, at the time of such a mark insert by the FP process after decoding, it is difficult to realize a real-time property. Therefore, where multimedia data are provided at real time such as the case of a movie, due to an influence of the process of inserting a mark into the stream data, it becomes difficult to provide the multimedia data at real time.

Therefore, the following describes an embodiment of the data receiving apparatus which realizes the real-time property of the FP process and in which the mark insert does not affect the quality of stream data as the eleventh embodiment.

Eleventh Embodiment

Figure 17:
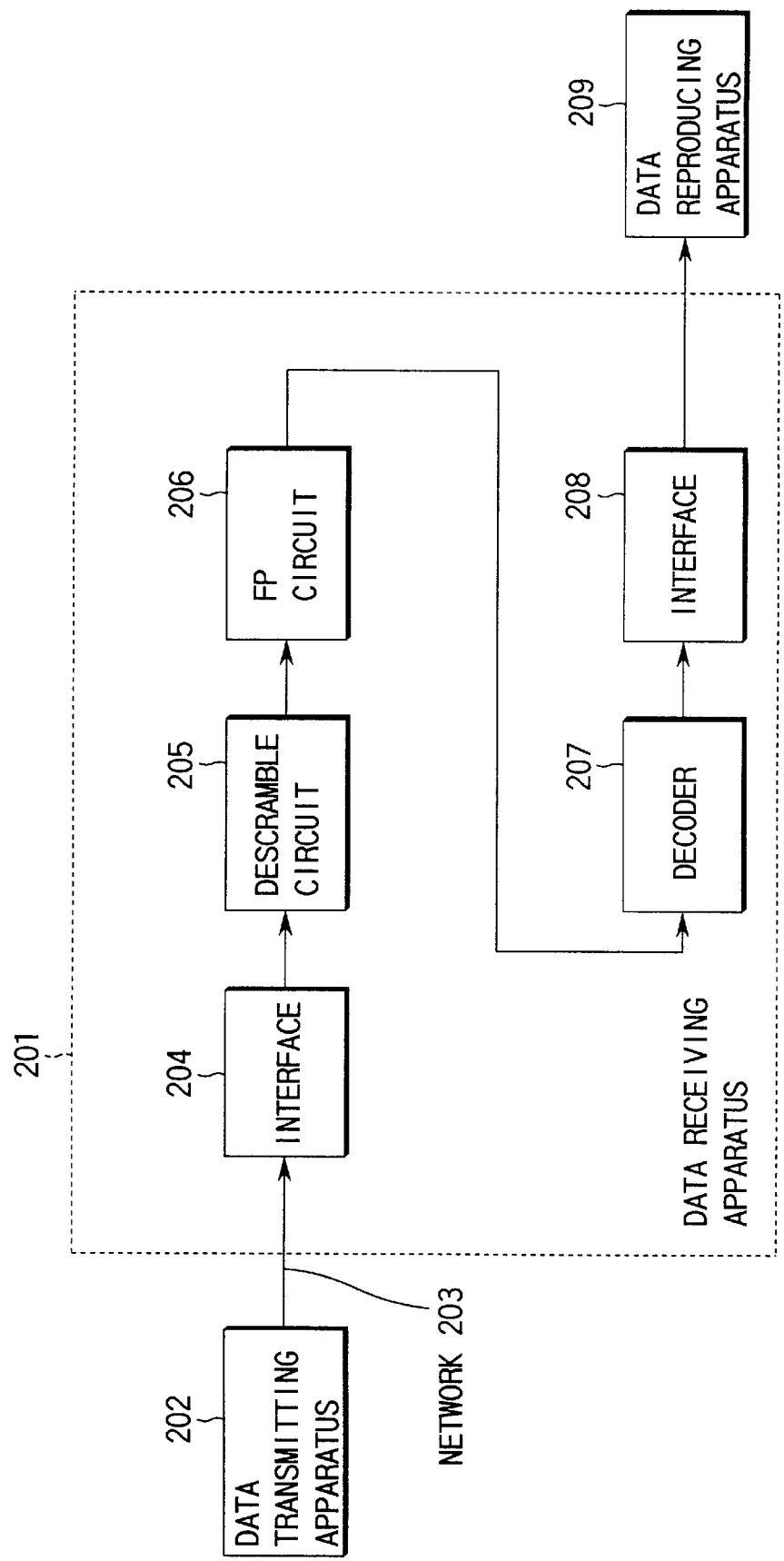
FIG. 17 is a block diagram showing the data receiving apparatus according to an eleventh embodiment of the present invention.
Figure 18:
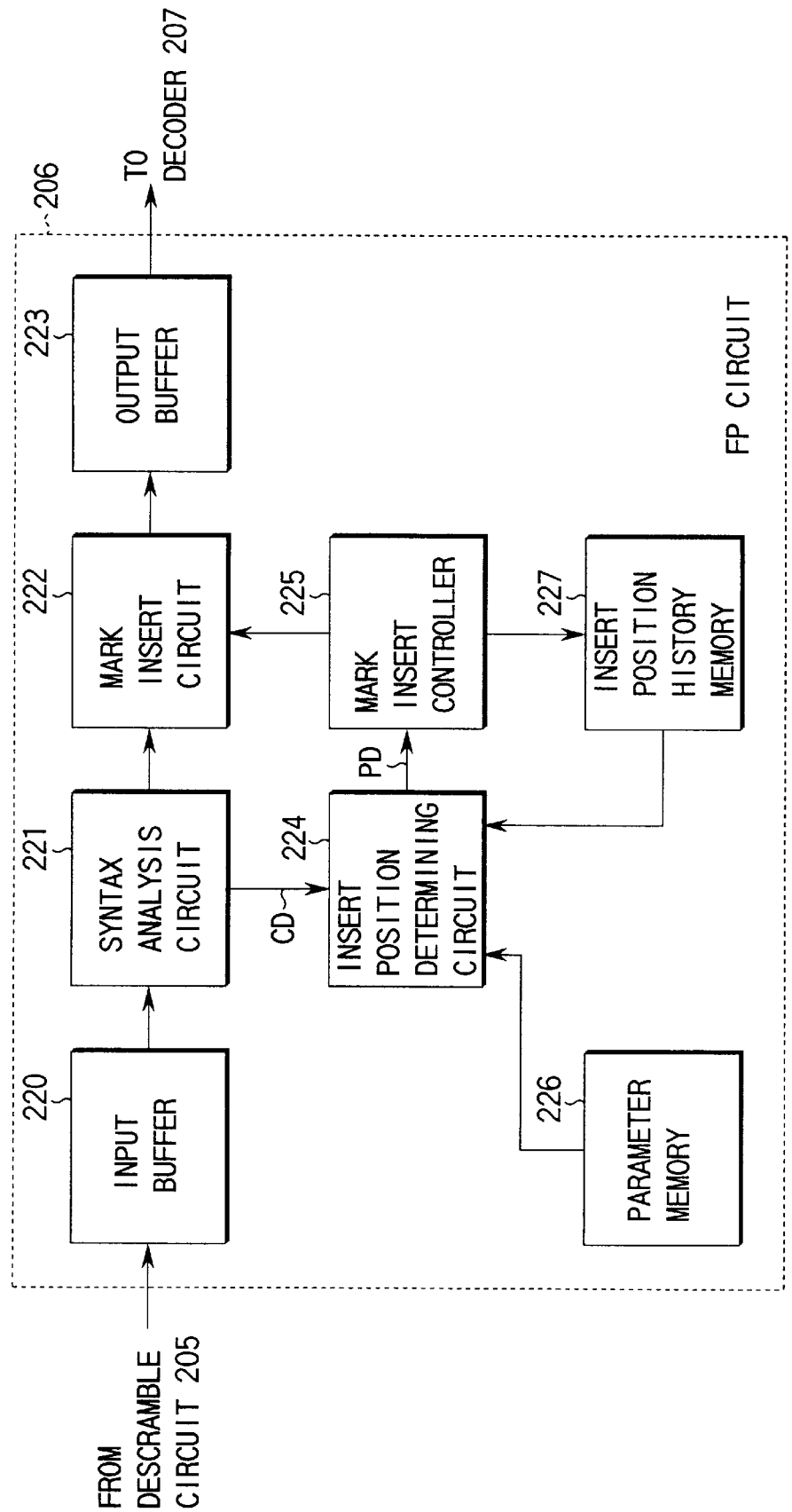
FIG. 18 is a block diagram of a fingerprint circuit according to the eleventh embodiment.
Figure 19:
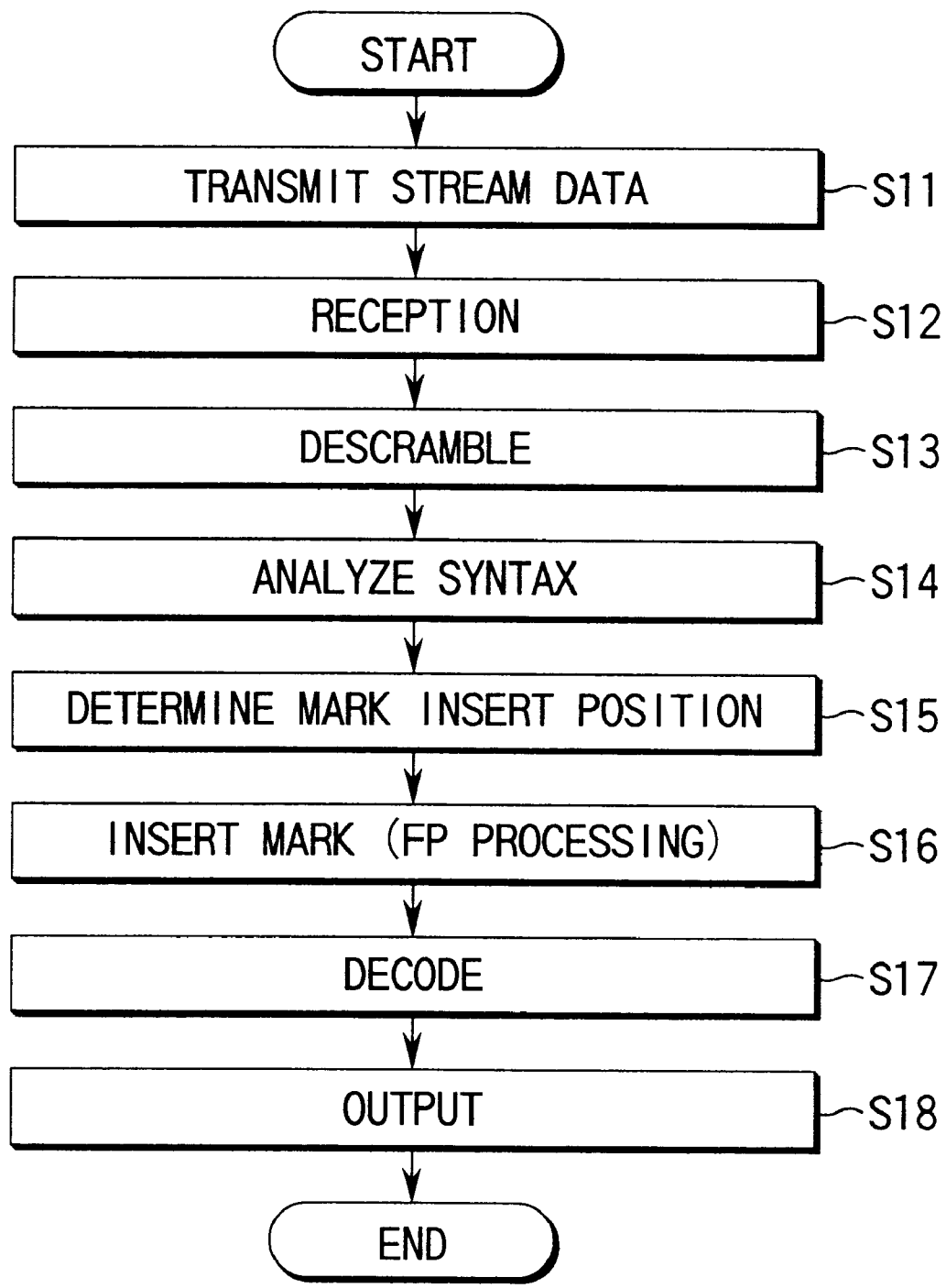
FIG. 19 is a flow chart showing a function according to the eleventh embodiment.

FIG. 17 is a block diagram of the data receiving apparatus according to the eleventh embodiment, and FIG. 18 is a block diagram of a fingerprint circuit 206 in the data receiving apparatus 201 in FIG. 17, and FIG. 19 is a flow chart explaining an operation of the present embodiment.

As shown in FIG. 17, as the eleventh embodiment, there is provided a data service system in which a data transmitting apparatus 202 is connected to a data receiving apparatus 201 via a communication medium 203 of a computer network or a digital broadcasting network, for example. The data transmitting apparatus 202 is an apparatus located at a side of data provider and transmitting multimedia data obtained by multiplexing video and audio data according to contents of contraction or a user's request. Hereinafter, the data transmitting apparatus 202 is occasionally referred to as a general idea including the data provider. Meanwhile, the data reproducing apparatus 209 is a user's home apparatus (corresponding to a set top box or IRD: Integrated Receiver Decoder) provided to the user's side, and it performs a process, described later, on received multimedia data, and reproduces and outputs contents data included in the multimedia data (hereinafter, occasionally described as a general idea including the user).

As shown in FIG. 17, the data receiving apparatus 201 includes an interface 204, a descramble circuit 205, an FP circuit 206, a decoder 207 and an interface 208. The interface 204 receives a stream data in the form of bit stream transmitted via the communication medium 203. The descramble circuit 205 performs the descramble process (a kind of decrypt process) for reproducing an original state of data prescriptively descrambled (a kind of encrypt) by the data receiving apparatus 202. In the case of receiving data which have not been scrambled, and in the case of performing the descramble process using another apparatus, the descramble circuit 205 may not be provided.

The FP circuit 206, as described later, receives a stream data coded by the MPEG-2 system, for example, and performs the FP process for inserting a mark (data, etc. for specifying a user) for protecting rights such as a copyright based on predetermined algorithm. The algorithm, as mentioned before, is a method for realizing the data insert process such as the digital watermarking and data hiding.

The FP circuit 206 performs the FP process for inserting a mark into a predetermined position of the coded stream data (a mark insert position, described later), and outputs the stream data into the decoder 207. The decoder 207 is a component for decoding the stream data coded by the MPEG-2 system, for example. The interface 208 is a signal converting section for converting the decoded stream data into a signal according to the specification of the data reproducing apparatus 209.

The data reproducing apparatus 209 is a personal computer and a television receiver (TV) having a display device. The interface 208 includes a D/A converter for converting digital data into an analog signal or a CVS converter for converting digital data into a composite video signal for the television receiver. Moreover, the data reproducing apparatus 209 includes not only the display device but also an output device such as a DVD (Digital Versatile Disk) drive. The DVD drive receives digital data outputted from the interface 209, and records the digital data to the DVD as a recording medium.

FIG. 18 is a detailed block diagram of the FP circuit 206. The FP circuit 206 has an input buffer 220, a syntax analysis circuit 221, a mark insert circuit 222, an output buffer 223, an insert position determining circuit 224, a mark insert controller 225, a parameter memory 226 and an insert position history memory 227.

The input buffer 220 temporarily stores a stream data in the form of a bit stream descrambled according to the descramble circuit 205, and outputs the stream data into the syntax analysis circuit 221. The syntax analysis circuit 221 analyzes a syntax (a rule of coded stream data) relating to a coding characteristic and a data structure from the stream data, and outputs the syntax data CD. The coding characteristic means characteristic data such as VLC (variable length code), FLC (fixed length code) used for the coding, and a data position not to be skipped. The data structure means specific data such as a sequence layer, a GOP (Group of Pictures) layer, a picture layer, a slice layer, a microblock layer, a block layer which are hierarchical structures of image data in the coding/decoding method according to the MPEG-2, and a data element (data item) set per each layer of hierarchical structure. Namely, the syntax is a rule representing the order and position of the data element (block of significant bit stream) before and after coding. Therefore, the syntax analysis circuit 221 determines a position, type and value of the data element forming the stream data, and output them as syntax data CD. The syntax analysis circuit 221 comprises a software operated by the CPU or a special hardware (logic circuit, etc.).

The insert position determining circuit 224 determines a mark insert position in the stream data where a mark is inserted and a mark based on the syntax data CD, marking parameter data stored in the parameter memory 226, and mark insert history data stored in the insert position history memory 227. The determined data is insert position data PD.

Examples of the marking parameter data in the parameter memory 226 are user specific data for identifying a user, use terminal specific data for specifying a user's terminal (data receiving apparatus 201), use service specific data for specifying contents of use service, use area specific data for specifying a use area, use time data for a time the user uses the provided data, predetermined common secret data, random data, marking parameter parity data, marking parameter completeness data. Further, the insert position history memory 227 records data representing a mark insert position where a mark is actually inserted into the stream data by the mark insert controller 225.

The mark insert controller 225 controls the mark insert circuit 222, and sets a mark insert position in the stream data and a content of a mark to be inserted according to the insert position data PD outputted from the insert position determining circuit 224. The mark insert circuit 222 performs the FP process for inserting the set mark into the insert position in the stream data transmitted via the syntax analysis circuit 221. The output buffer 223 temporarily stores the stream data after the mark has been inserted by the mark insert circuit 222, and outputs it to the decoder 207.

The operation of the present embodiment will be described with reference to the flow chart shown in FIG. 19.

According to the present embodiment, a data providing service system which, provides multimedia data such as a movie from the data provider 202 side to the contract user 201 via the digital broadcasting network, etc. is assumed. The data transmitting apparatus 202 transmits a stream data formed of a bit stream coded by the syntax of the MPEG-2 system specification, for example, including contents data such as a movie (composite data of an image and a sound) (step S11). The data receiving apparatus 201 receives the stream data transmitted via the interface 204, and descrambles the stream data using the descramble circuit 205 (steps S12 and S13).

Next, according to the present embodiment, the FP circuit 206 performs the FP process for inserting a mark which is specific data for protecting rights such as a copyright of the multimedia data into the determined position of the stream data (steps S14 through S16). Namely, as shown in FIG. 18, in the FP circuit 206 of the present embodiment, the syntax analysis circuit 221 analyzes the syntax relating to the coding characteristic and the data structure, and outputs the syntax data (step S14).

Further, the insert position determining circuit 224 determines the mark insert position of the stream data where a mark is inserted and a mark based on the syntax data CD, the marking parameter data stored in the parameter memory 226, and the mark insert history data stored in the insert position history memory 227 (step S15). The determination of mark insert position is specification of a block in the data structure of the MPEG-2, for example, and selecting of the block which has weak possibility of being skipped. In the stream data, the syntax differs with the adopted coding and decoding method such as the MPEG-2. Therefore, where a mark is inserted by the FP process, an influence which is exerted on the contents data (user data which are multimedia data used by a user) also differs with the insert position. Stated another way, a degree of deterioration in an image upon reproduction differs. Moreover, a position where a mark cannot be inserted also exists depending on the syntax. Therefore, the insert position determining circuit 224 can determine a suitable mark insert position based on the syntax data relating to the coding characteristic and the data structure obtained by the syntax analysis of the coded stream data.

The coded stream data is in accordance with a predetermined syntax. For example, MPEG-2 video data is in accordance with an international standard ISO 13818-2. The video stream data is represented by a concatenate of data elements. The data element comprises a header code such as a sequence header code and a group start code header, and character code such as a horizontal size value, a vertical size value, an intra quantizer matrix and a DCT DC size luminance. The syntax analysis in MPEG-2 means an analysis of video stream in accordance with the MPEG-2 video syntax in order to know what order or sequence of the data elements is linked in the video stream. The syntax data represents what data element is located in which position (bit position) in the video stream. For example, the syntax data represents that the sequence header code data are located from the first to thirty second bits and the horizontal size value data are located from the thirty third to forty fourth bits. Further, the syntax data may includes the value of the bit stream of the horizontal size value. The mark insert position represents into which data element the mark is inserted, i.e., a specified data element.

The mark insert circuit 222 performs the FP process for inserting a mark into a determined insert position in the stream data according to control of the mark insert controller 225 based on the insert position data PD (step S16). The decoder 7 performs the decoding process on the stream data which has been subject to the FP process and outputs the stream data into the interface 208 (step S18). The interface 208 performs the signal converting process for converting the stream data into a signal according to the specification of the data reproducing apparatus 209 connected to the data receiving apparatus 201.

According to the present embodiment, the FP process for inserting the mark which is the specific data for protecting rights such as a copyright of the data provider into the provided stream data can be performed by the FP circuit 206 of the data receiving apparatus 201 which is the user side. When the syntax analysis process is performed on the stream data coded by the MPEG-2 system specification, for example, and syntax data relating to the coding characteristic and data structure are obtained, the suitable mark insert position in the stream data into which the mark is inserted is determined. As a result, the FP circuit 206 can determine the mark insert position necessary for the FP process without decoding the coded stream data, and can perform the mark insert process. Since the mark can be inserted to the suitable position in the stream data without decoding and again coding the stream data, the mark insert process can be performed at real time.

In addition, when as the mark data not only the ordinary user specification data but also time stamp data, terminal specification data, area specification data, etc. are prepared in the parameter memory 26 so as to be used as the mark data, there also produces an effect that evidence which proves an infringement of digital rights is strengthen. Moreover, when parity and hash data are included in the mark itself or parameter data, it is possible to easily realize detection of alternation of a mark.

In the case the stream data is image data in the process for determining the mark insert position according to the present embodiment, considering a visual influence of the image, a method of superposing a characteristic pattern of the image (a peak of DCT coefficient, etc.) on the image data is considered. The DCT means Discrete Cosine Transform. In this case, a method of selecting a most remarkable peak is considered. Moreover, a method of detecting one or some peaks in the image from a plurality of candidates produces an effect that the specification of a mark is made difficult and the alternation of the mark is prevented. Further, a method of selecting the mark insert position from a plurality of candidates at random is effective in that the specification of the mark position is made difficult. In this method, the mark insert position specifies the position of the data element (DCT coefficient) determined by the mark insert algorithm.

In addition, there assumes injustice such that in order to remove or cancel the inserted mark, when after the stream data into which the mark has been inserted is decoded, it is again compressed by shifting or sampling a frame, the stream structure (data structure) is changed so that the mark is altered (for example, a previous P frame becomes a new I frame). Even if the previous P frame is not a frame into which a mark has not been directly inserted, when a mark has been inserted into a just previous I frame, an influence of the mark remains as a result of the predictive coding. Therefore, since the influence of the mark remains even after the recompressing, the mark can be reproduced by detecting the influence. Moreover, it is desirable that the mark is spatially inserted into one I frame or that the mark is inserted into a plurality of I frames. Further, it is desirable that the mark is inserted into the front and last microblock of a slice layer in the image data of the MPEG-2, for example, or that the mark is inserted into an arbitrary microblock.

As described above, according to the present embodiment, the data, which are transmitted as the stream data formed of the bit stream coded by a predetermined coding method, is received via a computer network or a digital broadcasting network, and the syntax analysis process is performed on the stream data, and the syntax data relating to the coding characteristic and data structure of the stream data are obtained, and the insert position in the stream data, into which a mark which can be reproduced is concealedly inserted, is determined based on the syntax data obtained by the syntax analysis process and predetermined parameter data which are prepared. Therefore, in the user's data receiving apparatus side, the FP process for inserting a mark for protecting the rights such as a copyright into a suitable position determined based on the syntax data relating to the coding characteristic and data structure can be performed on the stream data provided by the data provider. Therefore, the FP process can be performed at real time without previously decoding the coded stream data. In other words, the processes for decoding and compression-decoding for the FP process for mark insertion can be omitted. Moreover, since it is not necessary to perform the coding process on the stream data into which the mark has not been inserted, it can be prevented that a compression factor is lowered and thus a quantity of data is increased.

Though the FP circuit 206 is described as a hardware, it may comprise a memory which holds a fingerprint processing program formed of the aforementioned algorithm and a microprocessor (CPU) for performing the FP processing program.

Twelfth Embodiment

Figure 20:
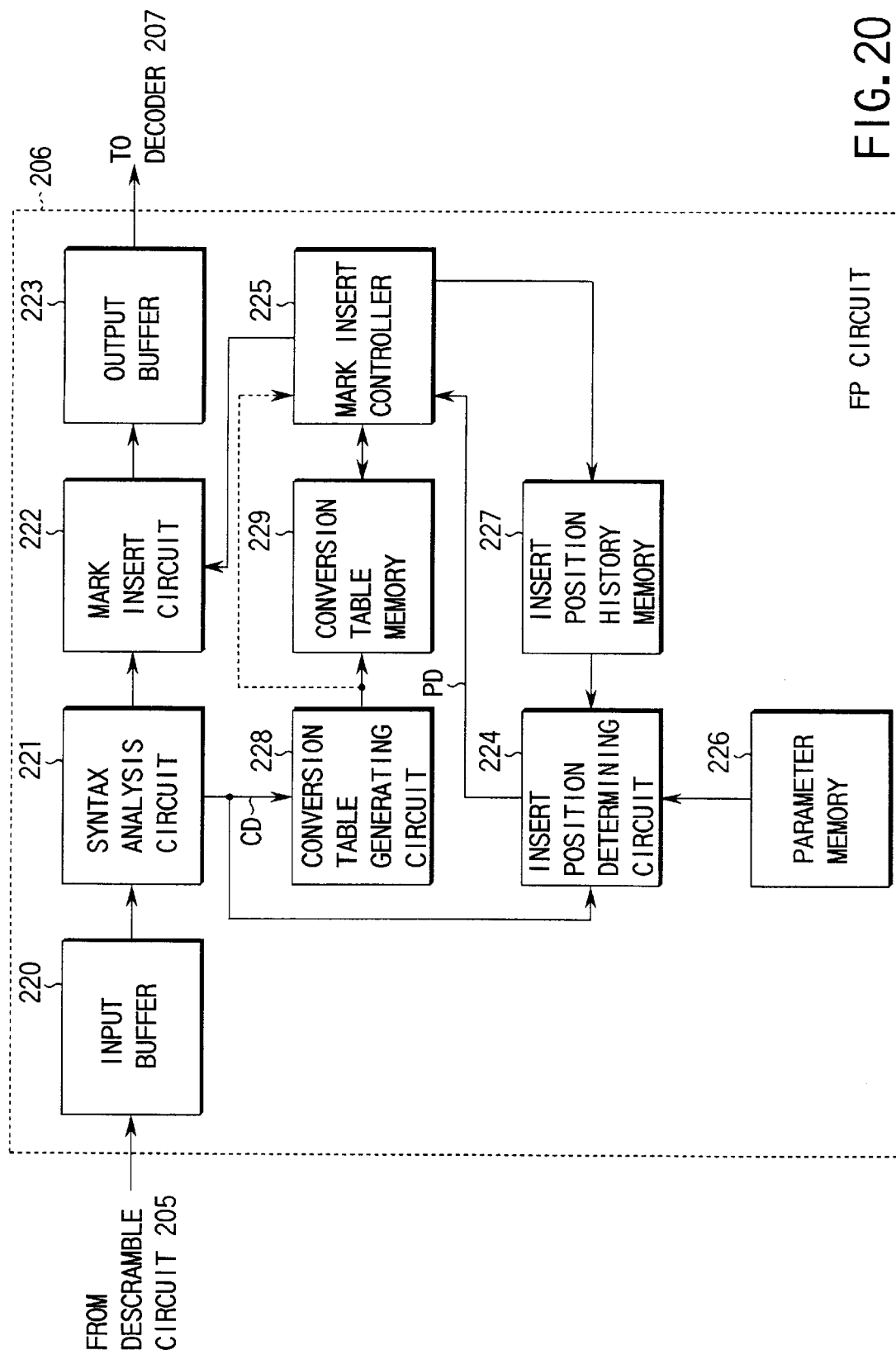
FIG. 20 is a block diagram showing the data receiving apparatus according to a twelfth embodiment of the present invention.

FIG. 20 is a block diagram showing a configuration of the FP circuit 206 according to the twelfth embodiment relating to a modification of the eleventh embodiment. In addition to the arrangement of the FP circuit in the eleventh embodiment, the FP circuit 206 according to the present embodiment, further includes a conversion table generating circuit 228 and a conversion table memory 229. The conversion table generating circuit 228 generates a conversion table (a table showing a conversion bit stream) for a bit stream (partial stream), in which the influence of the mark insertion exerted on the respective data of the VLC and FLC is considered, based on the coding characteristic of the coded stream data obtained by the syntax analysis circuit 221. The conversion table memory 229 stores the conversion table data.

The mark insert controller 225 instructs the mark insert circuit 222 to perform the process for replacing a bit stream corresponding to the mark insert position determined by the insert position determining circuit 224 with a bit stream into which a mark or a part of the mark is inserted referring to the conversion table data in the conversion table memory 229. Namely, the mark insert controller 225 can obtain current position data of the data element before mark insertion based on the coding characteristic according to the conversion table data. The current position data represents the position of the data elements in the bit stream. The mark insert circuit 222 or the mark insert controller 225 instructing the mark insert circuit 222 of the mark insertion requires the current position data in order to know the position of the data element which is a subject of insertion in the stream data when the mark is to be inserted.

The mark insert circuit 222 stores the bit stream which has not been subjected to the FP process in a buffer. The buffer has a list structure in which the data elements are elements of the list. The buffer is a FIFO buffer. A sequence number is assigned to the data element which is detected by the syntax analysis circuit 221. The buffer stores a pair of the data element and the sequence number.

This sequence number is supplied from the syntax analysis circuit 221 to the mark insert position determining circuit 224 as the syntax data. The mark insert controller 225 receives the sequence number for specifying the data element of the mark insert object from the mark insert position determining circuit 224 and supplies the sequence number to the mark insert circuit 222. The mark insert circuit 222 inserts the mark at a suitable position based on the received sequence number.

Alternately, the mark insert controller 225 may be informed by the mark insert circuit 222 of the sequence number specifying the data element which can be inserted at that time and may instruct the mark insert circuit 222 how insert the mark.

The conversion table generating circuit 228 does not have to always generate the conversion table, so it may outputs conversion table data which are prepared by default. The other components are the same as those in the eleventh embodiment.

Thirteenth Embodiment

As described above, the rights such as a copyright of multimedia data can be protected by the FP technique, and thus realization of the data providing service system becomes easy. However, the multimedia data are usually communicated as stream data obtained by multiplexing video data and audio data according to the MPEG-2 system specification, for example. As to the stream data, since syntax (a rule of coded stream data) differs with the coding/decoding (CODEC) method adopted, where a mark is inserted by the FP process, an influence which exerts contents data (user data which are multimedia data to be used by a user) also differs with the CODEC method. More specifically, the FP process causes a deterioration in an image of the contents data, and a certain stream has a position into which a mark cannot be inserted by the FP process according to the syntax.

There exist no FP process which is effective in all CODEC method. Moreover, a fingerprint process for inserting specific data not into the contents data of a video (including a still image) and audio but into header data in a stream is considered, but the insert position of the specific data is easily specified, and thus removal and alternation of the inserted specific data are easy. Therefore, it is not a desirable method.

The FP process is performed in the data receiving apparatus provided to a user. However, when a CODEC method for contents to be used is expected, and a function for performing corresponding FP process is provided into the data receiving apparatus, the FP method is limited. Therefore, another CODEC methods cannot be applied to the contents. Moreover, needless to say, it is prevented that a new CODEC method is flexibly applied to the contents and a new FP process.

Therefore, in order to comply with this problem, the following describes the thirteenth embodiment which can certainly cope with a CODEC method and FP process adopted by the data providing service system.

Figure 21:
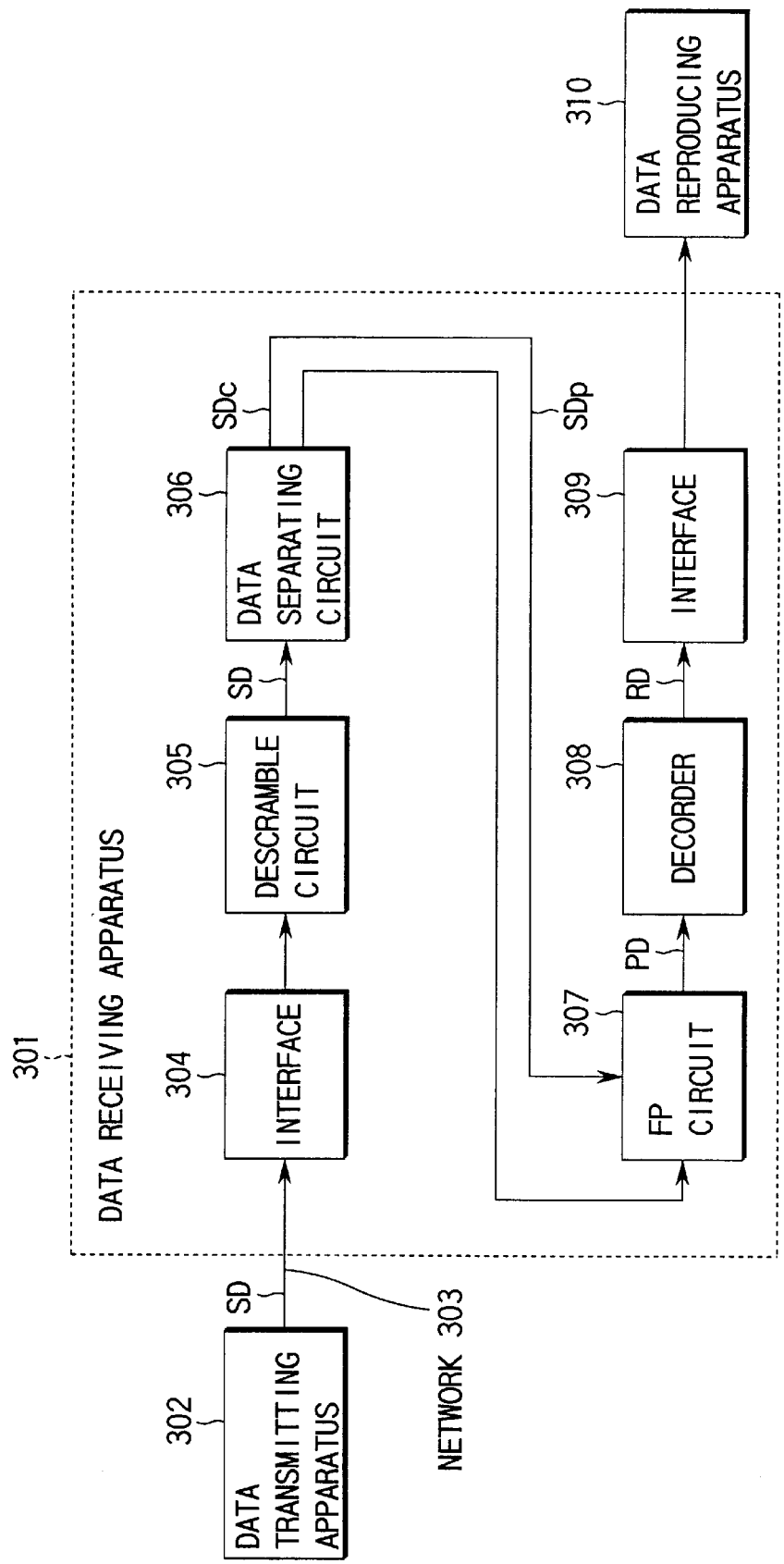
FIG. 21 is a block diagram showing the data receiving apparatus according to a thirteenth embodiment of the present invention.
Figure 22:
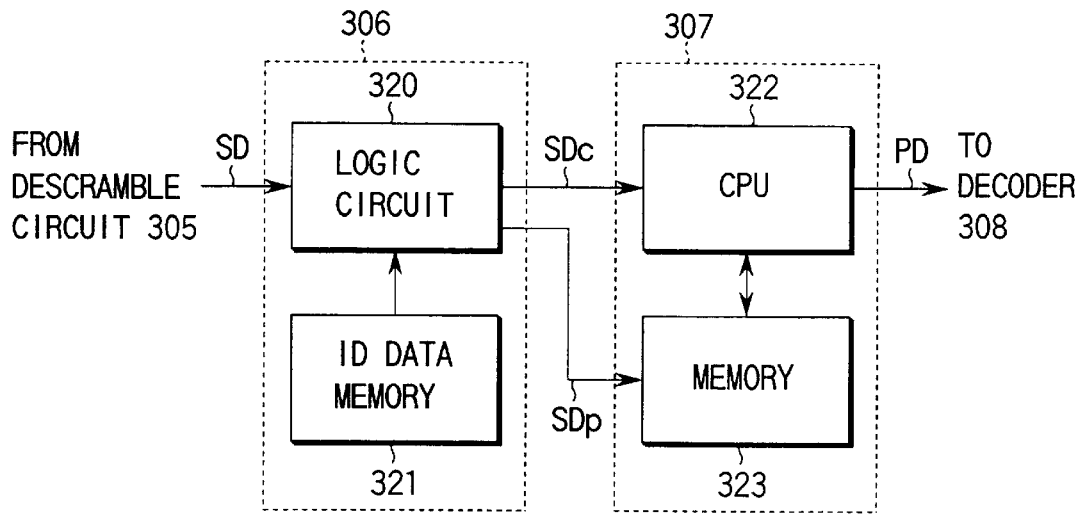
FIG. 22 is a block diagram of a data separating circuit and a fingerprint circuit according to the thirteenth embodiment.
Figure 23:
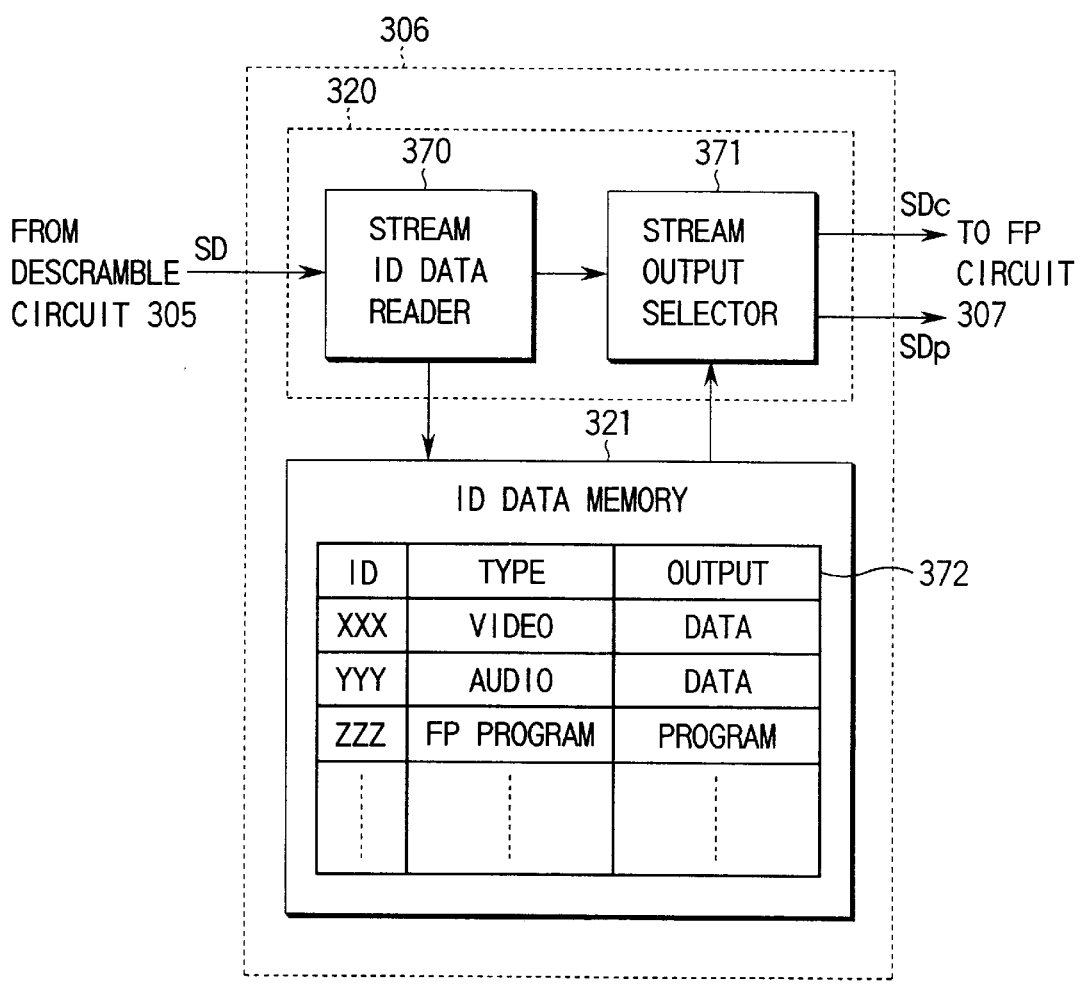
FIG. 23 is a block diagram of the data separating circuit according to the thirteenth embodiment.

FIG. 21 is a block diagram showing a data receiving apparatus 301 of the thirteenth embodiment, and FIG. 22 is a block diagram showing configurations of a data separating circuit and FP circuit according to the thirteenth embodiment, and FIG. 23 is a block diagram showing a detail of the data separating circuit.

According to the present embodiment, as shown in FIG. 21, the data service system is assumed in which a data transmitting apparatus 302 is connected to the data receiving apparatus 301 via a communication medium 303 of a computer network or a digital broadcasting network, for example. The data transmitting apparatus 302 is the data providing side (hereinafter, occasionally described as a general idea including the data provider) having a data transmitting apparatus which transmits multimedia data obtained by multiplexing video and audio data according to contents of user's request and contraction. Meanwhile, the data receiving apparatus 301 is a user's home apparatus (corresponding to a set top box or IRD and hereinafter, occasionally described as a general idea including the user) provided to the user's side, and it performs a process, described later, on received multimedia data, and reproduces and outputs contents data included in the multimedia data.

As shown in FIG. 21, the data receiving apparatus 301 includes an interface 304, a descramble circuit 305, a data separating circuit 306, a fingerprint circuit 307, a decoder 308 and an interface 309. The interface 304 receives stream data SD transmitted via the network 303. The descramble circuit 305 performs a descramble process (a kind of decrypt process) for reproduce an original state from data which have been scrambled (a kind of encrypt process) by the data transmitting apparatus 302. There exist various systems as a system of the descramble circuit 305, but since they are not directly related to the present invention, the description thereof is omitted. In the case of receiving data which have not been descrambled, or in the case of performing the descramble process using another apparatus, the descramble circuit 305 may not be provided.

The data separating circuit 306 is a kind of a filter for extracting FP program SDp for the FP process, described later, from stream data SD. Where the stream data SD includes contents data SDc and FP program SDp, the data separating circuit 306 separates and outputs both of them. Moreover, where the stream data SD includes only the FP program SDp, the data separating circuit 306 extracts the FP program SDp. The data separating circuit 306, as shown in FIG. 22, a logic circuit 320 and an ID data memory 321 for performing the data separating process. The ID data memory 321 stores ID data for identifying the FP program SDp included in a user data area, for example, of the stream data SD. Moreover, the ID data memory 321 also stores ID data for identifying the FP program SDp corresponding to provided contents data.

The FP circuit 307, as described above, inserts predetermined specific data (a mark for protecting rights such as a copyright) into the provided contents data based on predetermined algorithm. Here, the mark is data for specifying a user, etc. The algorithm, as described above, is a method for realizing the data insert process such as digital watermarking and data hiding.

As shown in FIG. 22, the FP circuit 307 of the present embodiment includes a memory 323 for loading the FP program SDp and a microprocessor (CPU) 322 for performing the FP process according to the FP program SDp. The memory 323 stores the FP program SDp extracted by the data separating circuit 306. The FP circuit 307 outputs data (contents data) PD, in which specific data have been inserted into the contents data SDc of the stream data SD, to the decoder 308.

The decoder 308 is a component for decoding (including expanding) the stream data PD which has been coded (including compressing) by the MPEG-2 system specification (CODEC system), for example. The interface 309 is a signal converting circuit for the decoded stream data RD into a signal according to the specification of the data reproducing apparatus 310. The data reproducing apparatus 310 means a personal computer and a television receiver (TV) having a display device, for example. The interface 309 includes a D/A converter for converting digital data into an analog signal or a CVS converter for converting digital data into a composite video signal (CVS) for the television receiver. Moreover, the data reproducing apparatus 310 further includes an output device such as a DVD (Digital Versatile Disk) drive besides the display device. The DVD drive inputs digital data outputted from the interface 309 thereinto, and records the digital data on the DVD which is a recording medium.

The data receiving apparatus of the present invention, as described above, is assumed as an apparatus for reproducing/outputting contents data included in multimedia data, but the data receiving apparatus may be an apparatus located between a transmitting side and a receiving side such as a data relay station. Namely, for example, the user side uses a personal computer as the data receiving apparatus, and after the relay station having the data separating circuit 306 and the FP circuit 307 according to the present embodiment performs the FP process on the data from the transmitting side, the data are transferred to the personal computer of the user side.

A detail of the data separating circuit 306 is shown in FIG. 23. The logic circuit 320 has a stream ID data reader 370 and a stream output selector 371. The stream ID data reader 370 extracts stream ID data from a received packet and stores it in the ID data memory 321. The whole stream data SD comprises a packet string.

The stream ID data are ID data for separating contents data SDc and corresponding FP program SDp from the stream data SD transmitted from the data provider side. The stream ID data, as shown in FIG. 23, are a table 372 roughly comprising a stream identifier, a contents type (for example, a type of CODEC system, PID, etc.), and designation data.

The stream output selector 371 identifies a contents type based on an identifier of the received stream data SD referring to the table 372 stored in the ID data memory 321, and separates the contents data SDc and FP program SDp based on the contents type and outputs them. The ID data memory 321 comprises a non-volatile EEPROM, for example, and every time when new stream ID data are transmitted, they are added and updated.

Figure 24:
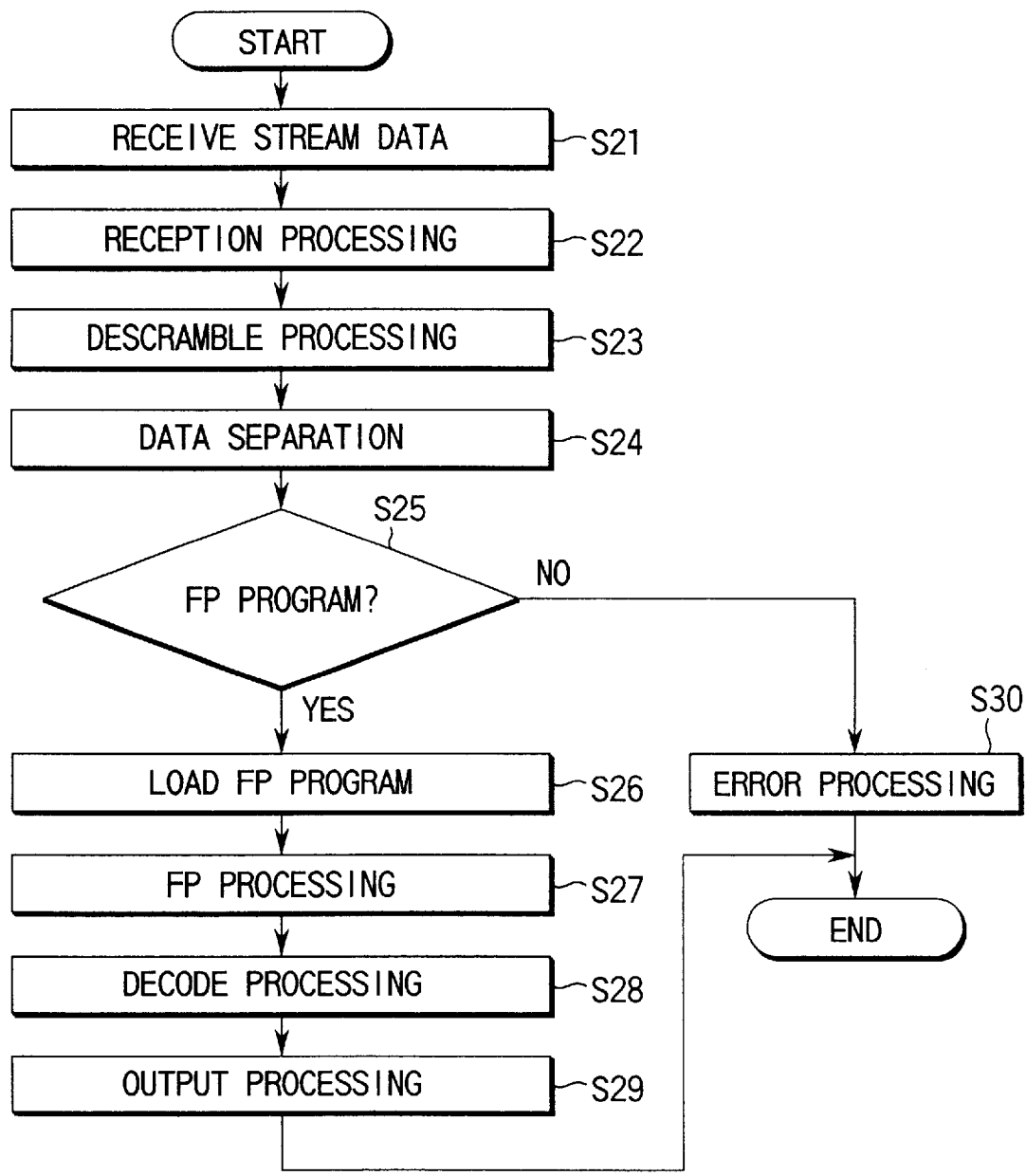
FIG. 24 is a flow chart showing a function of the thirteenth embodiment.

The following describes an operation of the present embodiment with reference to the flow chart shown in FIG. 24.

According to the present embodiment, a data providing service system, which provides multimedia data such as a movie to the contract user 301 from the data provider 302 side via the digital broadcasting network, for example, is assumed. The data transmitting apparatus 302 transmits the stream data SD including contents data (composite data of an image and sound) SDc such as a movie and the FP program SDp (step S21). The stream data SD is a stream data coded by syntax of the MPEG-2 system specification, for example. The FP program SDp is a program formed of algorithm for executing the FP process adapted for the syntax. More specifically, the fingerprint process is depend on the type of the coding method of the data stream. When the type of the coding method changes, the syntax also changes so that the mark insert algorithm suitable for the coding method should be searched.

The data receiving apparatus 301 receives the transmitted stream data SD through the interface 304, and performs the descramble process by using the descramble circuit 305 (steps S22 and S23).

Next, the data separating circuit 306 separates the FP program SDp and contents data SDc from the stream data SD (step S24). Where the stream data SD does not include the Fp program SDp, since the FP process, described later, cannot be performed, the data reproduction/output process is stopped as the error process (if NO at step S25, step S30 is performed). The error process may includes a process for requesting the data provider 302 side to transmit the FP program SDp, for example.

As shown in FIG. 22, the FP circuit 307 loads the FP program SDp extracted by the data separating circuit 306 into the memory 323 (if YES at step S25, step S26 is performed). The FP circuit 307 performs the FP process for inserting specific data into the contents data SDc separated by the data separating circuit 306 using the loaded FP program SDp (step S27). The FP circuit 307 has a function for judging as to whether corresponding FP program SDp has been loaded into the memory 323, and when loaded, the process for loading the FP program SDp is omitted, and the loaded program SDp may be used.

The decoder 308 decodes (including expansion process) the contents data PD which have been subject to the FP process and outputs the contents data PD into the interface 309 (step S28). The interface 309 performs the signal converting process for converting into a signal according to the specification of the data reproducing apparatus 310 connected to the data receiving apparatus 301 (step S29). More specifically, if the data reproducing apparatus 310 is, for example, a personal computer having a display device, the data reproducing apparatus 310 converts the decoded stream data (here, contents data such as a movie) RD into an analog signal, or outputs a digital signal.

As described above, according to the present embodiment, in the data receiving apparatus 301 having the function for performing the FP process, the FP program SDp included in the stream data transmitted from the data provider 302 side is loaded (downloaded) into the FP circuit 307 which performs the FP process. The FP circuit 307 uses the downloaded FP program SDp so as to perform the FP process on the contents data transmitted from the data provider 302 side. Therefore, the FP circuit 307 can perform the effective FP process which copes with the syntax of the provided contents data. In other words, the data provider 302 side can arbitrarily set the effecting FP process which copes with the syntax, etc. of the provided contents data. Therefore, it can flexibly cope with alternation of the FP process system and the CODEC system of contents data. As a result, the data provider 302 side can securely protect the rights such as a copyright of multimedia provided by the FP function without being limited by the CODEC system, etc. of the contents data.

Fourteenth Embodiment

Figure 25:
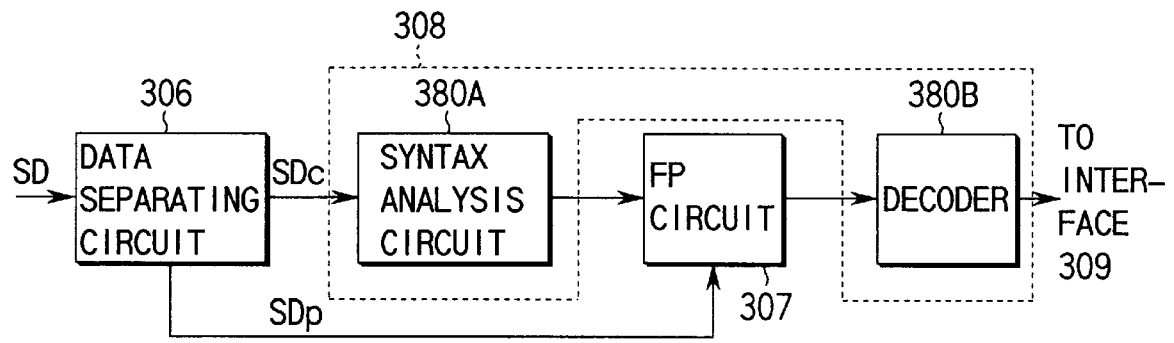
FIG. 25 is a block diagram of a main section of the data receiving apparatus according to a fourteenth embodiment of the present invention.

FIG. 25 is a drawing showing a main section of the fourteenth embodiment. According to the present embodiment, the decoder 308 of the thirteenth embodiment is divided into a syntax analysis circuit 380A and a decoder 380B in a narrow sense. The syntax analysis circuit 380A performs the syntax analysis process on the contents data SDc separated and outputted by the data separating circuit 306, and analyzes a data structure, etc. of the contents data SDc (a rule of a coded bit stream such as a hierarchical structure, an order and position of data elements) and outputs it into the FP circuit 307.

The FP circuit 307 uses the FP program SDp separated and outputted by the data separating circuit 306 so as to perform the FP process for inserting specific data such as a mark into a suitable position of the contents data SDc referring to the data structure, etc. outputted from the syntax analysis circuit 380A. Therefore, the FP circuit 307 can insert specific data into a suitable position or an arbitrary position (excluded insert addition position) of the contents data SDc.

Fifteenth Embodiment

Figure 26:
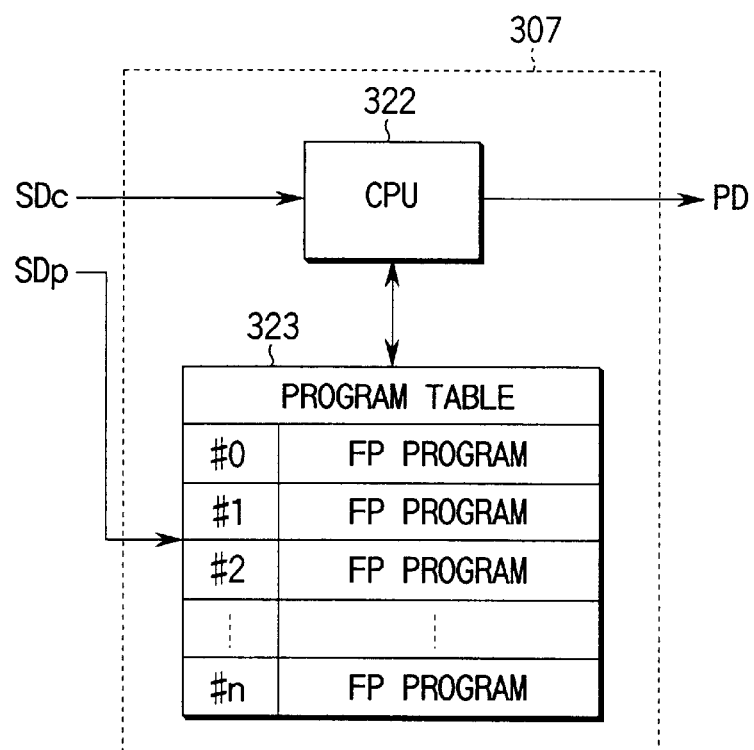
FIG. 26 is a block diagram of a main section of the data receiving apparatus according to a fifteenth embodiment of the present invention.

FIG. 26 is a drawing showing a main section of the fifteenth embodiment. In the thirteenth embodiment, it is assumed that the FP program SDp provided from the data provider 302 side as data to be added to contents data SDc is transmitted in one packet as a PES (Packetized Elementary Stream) packet of the MPEG-2 system specification, for example.

On the contrary, in the fifteenth embodiment, it is assumed that the FP program SDp is transmitted as a PES packet different from the contents data SDc, and a plurality of FP programs SDp corresponding to plural types of contents data are transmitted as an MPEG-2-TS (Transport Stream) packet of the MPEG-2 system specification.

As shown in FIG. 26, in the FP circuit 307 of the present embodiment, a program table formed of a plurality of FP programs separated by the data separating circuit 306 is stored in the memory 323 for loading the FP program SDp. ID data (#0 through #n) for identifying corresponding contents data are added to the respective FP programs in the program table 323. The ID data may specify PID (Packet Identification) or stream ID data of the stream data including target contents data or may specify both of them.

Figure 27:
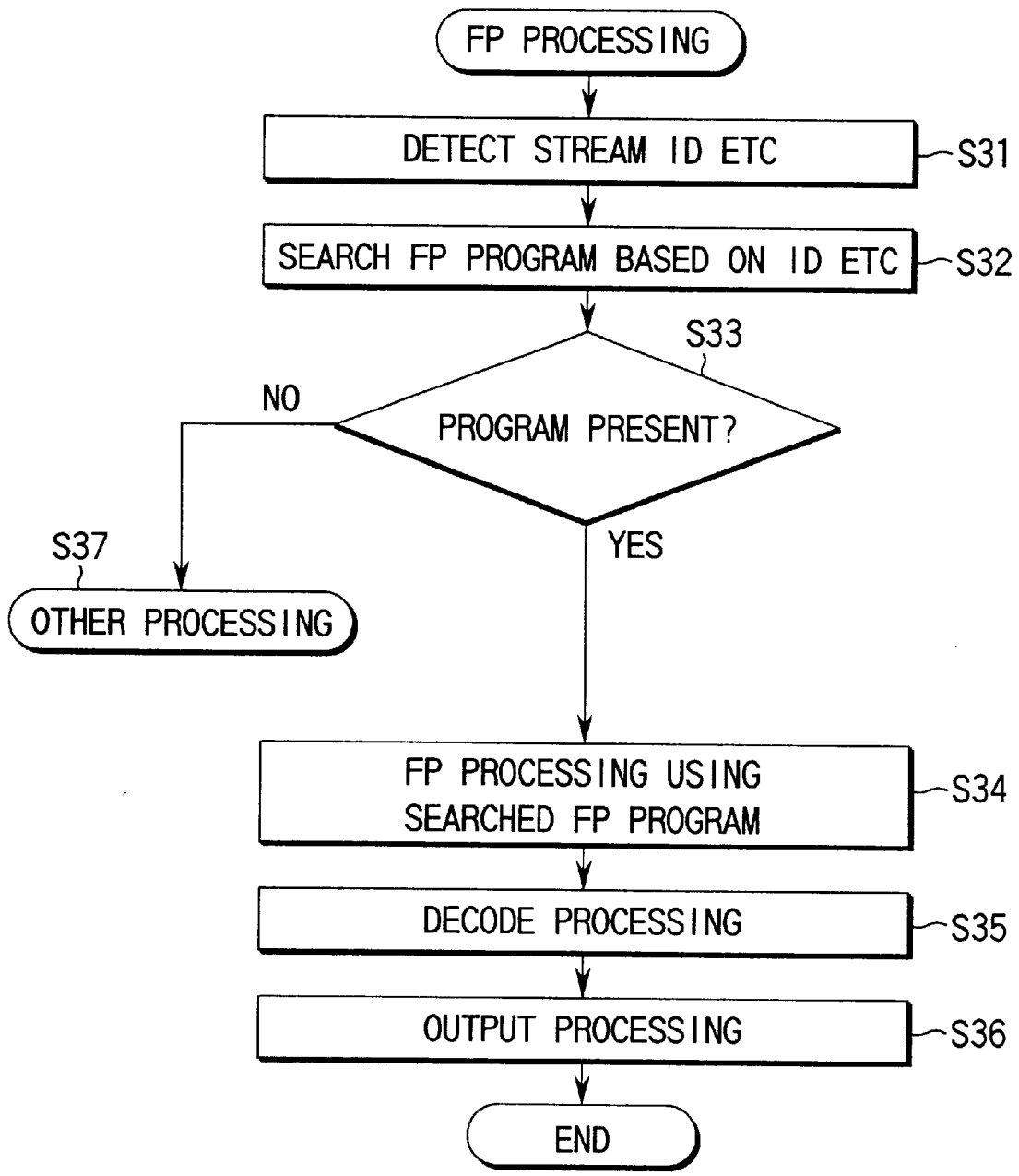
FIG. 27 is a flow chart showing a function of the fifteenth embodiment.

The following describes an operation of the fifteenth embodiment with reference to the flow chart in FIG. 27.

First, as shown in FIG. 26, it is assumed that in the FP circuit 307, a program table formed of a plurality of FP programs transmitted from the data provider 302 side is stored in the memory 323. When the FP circuit 307 detects a stream ID (or PID) of stream data SD from the data provider 302 side, the FP circuit 307 retrieves the FP program corresponding to the stream ID from the program table 323 (steps S31 and S32). In the data receiving apparatus 301, a series of the processes after receiving the stream data SD from the data provider 302 side is the same as that according to the present embodiment.

When the FP circuit 307 cannot retrieve the FP program from the program table 323, since an effective FP process cannot be performed, the data reproduction/output process is stopped (if NO at step S33, step S37 is performed).

The FP circuit 307 dispatches corresponding FP program and performs the effective FP process on the target contents data (step S34). Thereafter, in the similar manner, the decoder 308 decodes (including expansion) the contents data PD which have been subject to the FP process and outputs them into the interface 309 (step S35). The interface 309 performs the signal converting process for converting into a signal according to the specification of the data reproducing apparatus 310 connected to the data receiving apparatus 301 (step S36).

As described above, according to the present embodiment, even if the stream data including plural types of contents data are provided simultaneously, if the FP programs which cope with the respective types of contents data are loaded by the data receiving apparatus 301, the effective FP process can be performed on the respective contents data. Moreover, the FP program can be provided in a packet different from the contents data. As an application example of the present embodiment, a system, in which plural types of contents data are interleaved and provided, and the FP process is performed in time division by the respective FP programs, can be realized.

Figure 28:
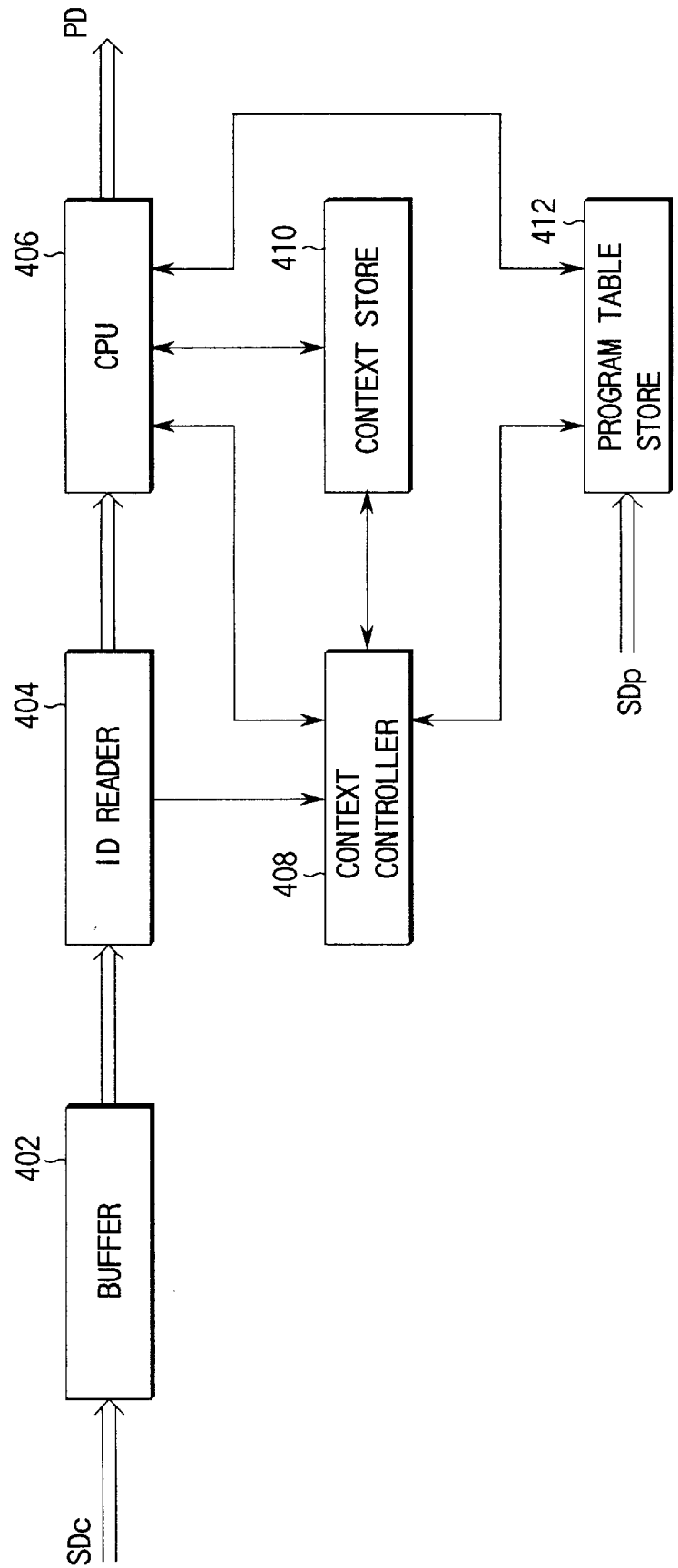
FIG. 28 is a block diagram showing a modification of the fifteenth embodiment.

This example is shown in FIG. 28. Plural contents data of plural types are formed into a packet and the packet is transferred in an interleaved manner, such as TS packet of MPEG-2. The plural FP programs are respectively run in a time divisional manner.

Contents data SDc is first stored in a buffer 402. Data for identifying the contents in the packet (stream-id and/or PID in the case of MPEG-2) is read by an ID reader 404. The context controller 408 determines whether or not the present packet belongs to the same contents stream which has been under the FP process at the time based on the contents identifying data. If the present packet belongs to the same contents stream which has been under the FP process at the time, the FP program which is now executed by a CPU 406 is kept being executed in order to continue the FP process. If the present packet does not belong to the same contents stream which has been under the FP process at the time, the context controller 408 stops the FP program which is now executed by the CPU 406 and stores the context data (which is required to restart the FP process at later time) in the context store 410. It is determined whether or not the context store 410 stores the context data of the FP process for the contents of the new packet. If the context data is stored, the FP program corresponding to the contents of the packet and the context data corresponding to the contents of the packet are loaded into the CPU 406 and the FP program is executed in order to restart the FP program for the contents. If the context data is not stored, the FP program corresponding to the contents is only loaded into the CPU 406 and the FP program is executed in order to start the FP program for the contents.

According to the present embodiment, plural types of contents data require the respective FP programs which cope with the respective type, but the FP process for the same type of plural contents data can be performed by one FP program. Therefore, in the case of receiving a plurality of contents data which are of the same type, the FP circuit 307 may perform the FP process using the common FP program.

Even if the FP program corresponding to the same type (the CODEC system is the same) of contents data exists, when it is provided as different stream data, rightful owners of the contents data (creator and data provider) are not always the same. Therefore, the FP process according to different specific data or different algorithm should be performed on such contents data by different FP programs.

Sixteenth Embodiment

Figure 29:
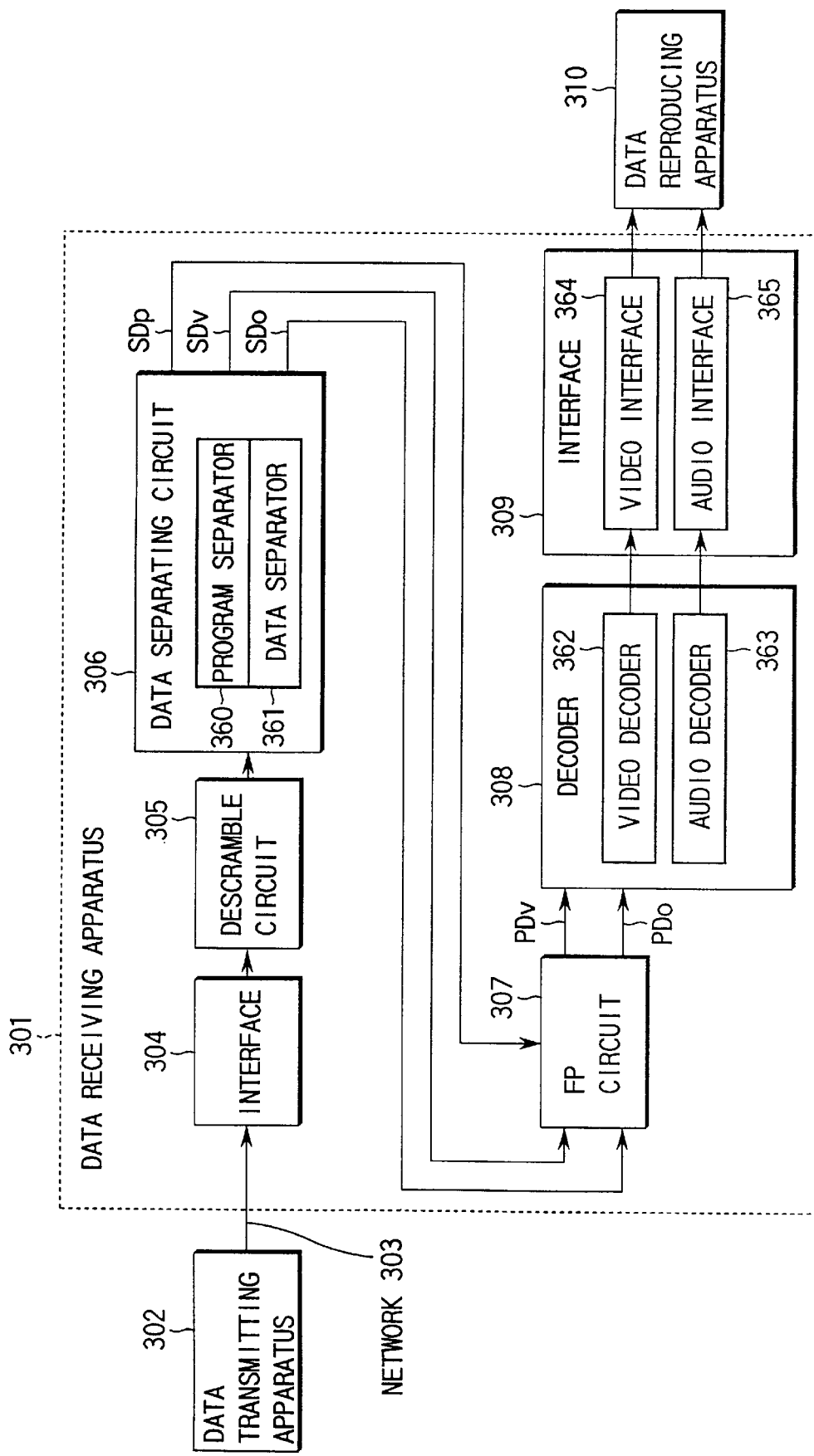
FIG. 29 is a block diagram showing the data receiving apparatus according to a sixteenth embodiment of the present invention.

FIG. 29 is a block diagram showing a constitution of the data receiving apparatus 301 according to the sixteenth embodiment. The present embodiment is different from the thirteenth embodiment in that the data separating circuit 306 includes a program separator 360 for separating a FP program SDp from stream data and a data separator 361 for separating video data SDv and audio data SDo from multiplexed contents data. The FP circuit 307 has a function for performing the FP process on the video data SDv and audio data SDo separated by the data separator 361. The decoder 308 includes a video decoder 362 for decoding (include expanding) the video data PDv which have been subjected to the FP process by the FP circuit 307, and an audio decoder 363 for decoding the audio data PDo which have been subjected to the FP process. The interface 309 includes a video interface 364 for outputting video data from the video decoder 362 as a video signal, and an audio interface 365 for outputting audio data from the audio decoder 363 as an audio signal.

According to such an arrangement, the data receiving apparatus 301 receives multiplex stream data of video and audio, and can perform the FP process on both the video and audio data. Therefore, even if the video or audio data are extracted from multimedia data received by the user side and recorded on DVD, for example, since the FP process can be performed on the respective data, the rights of the respective data can be protected.

According to the present embodiment, the video decoder 362 and the audio decoder 363 may be arranged so as to have respective FP circuits. In this case, the data separating circuit 306 separates FP programs corresponding to the video data SDV and the audio data SDo, and supplies the FP programs to the decoders 362 and 363 respectively. The video decoder 362 performs the FP process on the video data SDv separated by the data separator 361 using the FP program supplied from the data separating circuit 306. Moreover, the audio decoder 363 performs the FP process on the audio data SDo separated by the data separator 361 using the FP program supplied from the data separating circuit 361.

As described above, according to the present invention, the data receiving apparatus comprises the first and second units, the first unit encrypts supplied data, which have been encrypted according to the first encrypt system, according to the second encrypt system so as to transfer them to the second unit, and the second unit decrypts the data according to the first encrypt system so as to returns them to the first unit. Therefore, since at least only the data which have been subject to the second encrypt appear in the interface between the first and second units, illegal use of data obtained by decrypting the encrypted data can be prevented. Moreover, since user's secrete data are not outputted to the outside of the second unit, the user's secret data can be protected securely.

In addition, according to the present embodiment, ID data for effectively realizing the protection of rights of the data provider are inserted into provided data by the IC card prepared for each user. Therefore, where data reproduced by a user are copied into a recording medium and distributed illegally, the user who copies the data can be specified by reproducing ID data from the data. Further, since the ID data for protecting the rights are inserted by the IC card, it is not necessary to perform the data insert process by the data service provider side. As a result, it is possible to easily realize a data service system which provide data to many and unspecified users, such as a computer network and a digital broadcasting network. Moreover, ID data for effectively protecting the rights of the data provider can also be efficiently inserted into data reproduced by the data reproducing apparatus, which is connected to the data receiving apparatus as local media. Further, in the data service system such as a digital broadcasting network, a user ID system for limiting a specific receiver is combined therewith, and thus it is possible to efficiently perform the ID data insert process.

Furthermore, according to the present invention, in the user's data receiving apparatus side, it is possible to realize the FP process for inserting a mark for protecting the rights such as a copyright into a suitable position determined based on syntax data relating to a coding characteristic and data structure on stream data provided from the data provider side. Therefore, the FP process can be performed at real time without previously decoding the coded stream data. In other words, the process for compress-decoding which is necessary for the FP process of the mark insertion can be omitted. Moreover, since it is not necessary to perform the coding process on the stream data into which a mark has been inserted, a problem that the compression factor is lowered and a quantity of data is increased can be prevented. As a result, it is possible to realize the data providing service system which can protect the rights such as a copyright efficiently and securely.

Further, according to the present invention, in the data receiving apparatus having the FP function, the FP function, which can cope with the CODEC system and FP process system adopted by the data providing service system, is realized, and thus the FP function, which can flexibly cope with old and new CODEC systems of the contents of provided multimedia data and a new FP process system, can be realized. Therefore, it is possible to securely protect the rights such as a copyright of the multimedia data in the data providing service and thus to construct the data providing service system which made efficient distribution possible.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, each embodiment describes independently, but a plurality of embodiments may be suitably combined. The FP process may be combined with the first embodiment. In this case, the function of the IC card 110 (data insert unit 120) in the second through ninth embodiments, or the FP circuit 206 in the eleventh and twelfth embodiments, or the FP circuit 307 in the thirteenth through sixteenth embodiments may be provided to the security module 70 in the first embodiment (FIG. 2).

What is claimed is:

1. A data receiving apparatus comprising:
   a first unit for receiving encrypted data that have been encrypted according to a first system; and
   a second unit connected to said first unit detachably,
   wherein said first unit comprises means for encrypting, according to a second system, the received data, which have been encrypted according to the first system, means for outputting the doubly encrypted data to said second unit, and means for decrypting data supplied from said second unit according to the second system, and
   said second unit comprises means for decrypting the doubly encrypted data supplied from said first unit according to the first system and means for transmitting the data back to said first unit.

2. The apparatus according to claim 1, in which said first unit comprises key generating means for generating an encrypt/decrypt key of the second system, and the key generated from said key generating means is not outputted to the outside of said first unit.

3. The apparatus according to claim 2, in which the encrypt/decrypt key of the second system generated from said key generating means of said first unit is variable.

4. The apparatus according to claim 1, in which said second unit comprises a memory for storing a decrypt key of the first system thereinto, and the key read out from said memory is not outputted to the outside of said second unit.

5. The apparatus according to claim 1, in which said second unit comprises means for inserting ID data peculiar to said second unit into the data supplied from said first unit.

6. The apparatus according to claim 5, in which said inserting means comprises:
   syntax analysis means for analyzing syntax of the data supplied from said first unit, and obtaining syntax data representing a coding characteristic and data structure of the data supplied from said first unit;
   means for determining an insert position according to the syntax data; and
   means for inserting the ID data into the position of the data supplied from said first unit determined by said determining means.

7. The apparatus according to claim 5, in which said inserting means inserts the ID data based on an insert process program included in the data supplied from said first unit.

8. A data receiving apparatus which is connected to a card module having data inserting means for inserting predetermined ID data into input data transmitted from an external apparatus and which receives the input data, said data receiving apparatus comprising:
   means for receiving the input data transmitted from the external apparatus;
   interface means connected to said card module; and
   control means for transmitting the input data received by said receiving means to said card module connected to said interface means and making the ID data inserted into the input data by using said data inserting means so as to receive the input data into which the ID data have been inserted from said card module.

9. The apparatus according to claim 8, in which said data inserting means concealedly inserts the ID data, which identifies a user who is provided with data from a data creator or provider and which can be reproduced by a predetermined reproducing process, into the input data according to a predetermined process.

10. The apparatus according to claim 8, in which said data inserting means concealedly inserts the ID data into the input data according to a process based on a program for inserting the ID data included in the input data transmitted from the external apparatus.

11. The apparatus according to claim 9 or 10, in which the process which is performed by said data inserting means is a data hiding process or a watermarking process.

12. The apparatus according to claim 8, in which said receiving means comprises an interface connected to a computer network, communication channel or broadcasting network.

13. The apparatus according to claim 8, in which said receiving means comprises an interface connected to a data recording medium.

14. The apparatus according to claim 8, further comprising reproducing means for reproducing the input data, into which the ID data have been inserted and which are outputted from said control means using a predetermined reproducing apparatus.

15. A card module adapted to be connected to a data receiving apparatus, comprising:
   a memory for storing the ID data; and
   data inserting means for receiving data received by said data receiving apparatus and inserting the ID data into received data and for transmitting the received data back to said data receiving apparatus.

16. The card module according to claim 15, in which:
   said data inserting means comprises descrambling means for receiving scrambled data from said data receiving apparatus and descrambling received data, and
   said data inserting means inserts the ID data into an output from said descrambling means.

17. The card module according to claim 15, in which said data inserting means concealedly inserts the ID data, which identifies a user who is provided with data from a data creator or provider and which can be reproduced by a predetermined reproducing process, into the received data according to a predetermined process.

18. The card module according to claim 15, in which said data inserting means concealedly inserts the ID data into the received data according to a process based on a program for inserting the ID data included in the received data transmitted from the external apparatus.

19. The card module according to claim 17 or 18, in which the predetermined process which is performed by said data inserting means is a data hiding process or a watermarking process.

20. A data receiving apparatus which is connected to a card module having authentication means for authenticating a user who is provided with data from a data creator or provider and which receives input data transmitted from an external apparatus, said apparatus comprising:

means for receiving the input data;

interface means connected to a card module;

data inserting means for making card module connected to said interface means to perform a user authentication process on the data received by said receiving means, inputting ID data which identifies the user and which is obtained by the authentication process, and for inserting the ID data which can be reproduced into the input data received by said receiving means; and control means for outputting data including the ID data which have been inserted by said data inserting means.

21. The apparatus according to claim 20, in which said data inserting means concealedly inserts the ID data into the input data according to a process based on a program for inserting the ID data included in the input data transmitted from the external apparatus.

22. A data receiving apparatus for receiving data transmitted from an external apparatus and outputting the data into a reproducing apparatus, comprising:

data inserting means for inserting ID data which can be reproduced into received data; and output means for outputting the received data, into which the ID data have been inserted by said data inserting means, into said reproducing apparatus.

23. A data receiving apparatus for receiving a stream data, which is transmitted from an external apparatus and formed of a bit stream which has been coded by a predetermined coding system, and performing an outputting process according to a specification of a reproducing apparatus, said data receiving apparatus comprising:

means for receiving the stream data;

syntax analysis means for performing a syntax analysis process on the stream data received by said receiving means and obtaining syntax data relating to a coding characteristic and data structure of the stream data;

determining means for determining an insert position in the stream data, into which specific data which can be reproduced are concealedly inserted, based on the syntax data obtained by said syntax analysis means and predetermined parameter data;

inserting means for inserting the specific data into the insert position in the stream data determined by said determining means; and output means for performing a predetermined output process according to a predetermined specification of reproduction/output on the stream data outputted from said inserting means.

24. The apparatus according to claim 23, in which said output means comprises decoding means for performing a predetermined decoding process on the stream data outputted from said inserting means.

25. The apparatus according to claim 23, in which:

the parameter data is data which includes user specific data for specifying a user, use terminal specific data for specifying a use terminal apparatus used by a user, use time data and use area specific data and which sets the specific data, and said determining means determines an insert position in the stream data where a bad influence, which is exerted on reproduction/output characteristic and reproducibility of the specific data upon reproducing/outputting contents data included in the stream data, can be suppressed when the specific data set according to the parameter data are inserted.

26. The apparatus according to claim 23, which further comprises:

memory means for storing data of the insert position determined by said determining means as insert position history data, and in which said determining means uses the insert position history data stored in said memory means when determining an insert position in a new stream data of the specific data.

27. The apparatus according to claim 23, in which said inserting means performs a program for executing a data hiding process for concealedly inserting prepared specific data which can be reproduced and identified, a watermarking process or a fingerprint process so as to insert the specific data into the insert position in the stream data determined by said determining means.

28. The apparatus according to claim 23, in which:

the data transmitted from the external apparatus has contents data which can be used by an image reproducing apparatus and an audio reproducing apparatus and which have been coded by a predetermined multimedia coding system, and is a stream data, which is transmitted via a computer network, a digital communication channel or a digital broadcasting network, according to a predetermined synchronizing specification and multiplexing specification, and said output means comprises means for decoding the contents data outputted from said data inserting means based on the multimedia coding system, and for performing a signal process, which is required for the image reproducing apparatus or audio reproducing apparatus, on the decoded contents data.

29. The apparatus according to claim 23, which further comprises:

conversion table generating means for generating conversion table data for referring to a conversion result of the specific data in the partial stream constitution corresponding to the insert position in the stream data determined by said determining means; and conversion table storing means for storing the conversion table data, and in which said inserting means performs the data insert process for inserting the specific data based on the insert position in the stream data determined by said determining means and the conversion table data in said conversion table storing means.

30. A data inserting method, which is applied to a data receiving apparatus having functions for receiving data to be transmitted as a stream data formed of a bit stream, which has been coded by a predetermined coding system, from the outside, for outputting the data according to a predetermined specification of reproduction/output, and concealedly inserting specific data which can be reproduced and identified into the stream data, said method comprising the following steps of:

performing a syntax analysis process on the received stream data and obtaining syntax data relating to a coding characteristic and data structure of the stream data;

determining an insert position in the stream data into which the specific data which can be reproduced are concealedly inserted based on the syntax data obtained by said obtaining step and predetermined parameter data;

inserting the specific data into the insert position in the stream data determined by said determining step; and outputting the stream data, into which the specific data have been inserted by said inserting step, according to the predetermined specification of reproduction/output.

31. A data receiving apparatus comprising:

means for receiving data transmitted from an external apparatus;

extracting means for extracting a program which is included in the data received by said receiving means and which is used for concealedly inserting specific data which can be reproduced into specified data; and data inserting means for inserting the specific data into the specified data included in the data received by said receiving means using the program extracted by said extracting means and outputting the specified data into which the specific data is inserted.

32. A data receiving apparatus comprising:

means for receiving data transmitted from an external apparatus;

extracting means for extracting a program which is included in the data received by said receiving means and which is used for concealedly inserting specific data which can be reproduced into specified data;

data inserting means for inserting the specific data into the specified data included in the data received by said receiving means using the program extracted by said extracting means and outputting the specified data; and output means for outputting the data outputted from said data inserting means.

33. The apparatus according to claim 31 or 32, in which:

the data transmitted from the outside includes contents data which can be used by reproduction/output and the program, and said extracting means comprises means for separating the program corresponding to the contents data from the data received by said receiving means based on ID data for identifying the contents data and outputting the program.

34. The apparatus according to claim 31 or 32, in which said data inserting means comprises:

memory means for loading the program extracted by said extracting means; and means for performing a data hiding process, watermarking process or fingerprint process for concealedly inserting the specific data which can be reproduced into the contents data included in the data received by said receiving means based on algorithm of the program.

35. The apparatus according to claim 31 or 32, in which said data inserting means comprises:

memory means for storing plural types of programs transmitted from the outside; and means for inserting the specific data by retrieving the program corresponding to the contents data from said memory means and by using the program based on ID data for identifying the contents data included in the data received by said receiving apparatus.

36. The apparatus according to claim 32, in which:

the data transmitted from the outside includes contents data which can be used by video output and audio output and which has been coded by a predetermined multimedia coding system, and said output means comprises means for decoding the contents data outputted from said data inserting means based on the multimedia coding system and for performing a signal process, which is required for the video output and audio output, on the decoded contents data.

37. The apparatus according to claim 31 or 32, in which:

the data transmitted from the outside is a stream data according to predetermined synchronizing and multiplexing specifications transmitted via a computer network, digital communication channel or digital broadcasting network, and said receiving means comprises an interface which is connected to the computer network, digital communication channel or digital broadcasting network.

38. A data inserting method which is applied to a data receiving apparatus having functions for receiving data transmitted from an external apparatus, outputting contents data, which can be used and included in the data, according to reproduction/output forms, and concealedly inserting specific data which can be reproduced and identified into the contents data, said method comprising the following steps of:

extracting a program used for performing the insert process from the data transmitted from the external apparatus;

storing the program extracted by said extracting step into memory means according to ID data for identifying the contents data; and concealedly inserting the specific data into the contents data by using the program stored in the memory means by said storing step.

39. A data inserting method which is applied to a data receiving apparatus having functions for receiving data transmitted from an external apparatus, outputting contents data, which can be used and included in the data, according to reproduction/output forms, and concealedly inserting specific data which can be reproduced and identified into the contents data, said method comprising the following steps of:

extracting a program used for performing the insert process from the data transmitted from the outside;

storing plural types of the programs extracted by said extracting step into memory means according to ID data for specifying the contents data;

retrieving a program corresponding to the contents data from said memory means based on the ID data; and concealedly inserting the specific data into the contents data by using the program retrieved from the memory means by said retrieving step.

* * * * *